(12) United States Patent
Kanai

(10) Patent No.: US 7,800,782 B2
(45) Date of Patent: Sep. 21, 2010

(54) IMAGE PROCESSING DEVICE, COLOR CONVERSION TABLE CREATING DEVICE, DISPLAY DEVICE, IMAGE PROCESSING METHOD, COLOR CONVERSION TABLE CREATING METHOD, AND METHOD OF MANUFACTURING DISPLAY DEVICE

(75) Inventor: Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 746 days.

(21) Appl. No.: 11/695,828

(22) Filed: Apr. 3, 2007

(65) Prior Publication Data

US 2007/0229868 A1    Oct. 4, 2007

(30) Foreign Application Priority Data

Apr. 3, 2006  (JP) ............................. 2006-101665

(51) Int. Cl.
  *G06F 15/00*  (2006.01)
(52) U.S. Cl. .................. 358/1.9; 358/525; 358/523; 358/518
(58) Field of Classification Search .................. 358/1.9, 358/525, 523, 518
See application file for complete search history.

(56) References Cited

U.S. PATENT DOCUMENTS

| 5,452,408 | A | * | 9/1995 | Westdijk et al. ............. 345/589 |
| 5,742,296 | A | | 4/1998 | Yamada et al. |
| 5,856,876 | A | | 1/1999 | Sasanuma et al. |
| 7,006,105 | B2 | | 2/2006 | Deishi et al. |
| 2004/0145759 | A1 | * | 7/2004 | Nishida et al. ............... 358/1.9 |
| 2004/0212817 | A1 | * | 10/2004 | Hagai et al. .................. 358/1.9 |
| 2006/0285134 | A1 | * | 12/2006 | Viturro et al. ................ 358/1.9 |

FOREIGN PATENT DOCUMENTS

| JP | A-5-191641 | 7/1993 |
| JP | A-8-289149 | 11/1996 |
| JP | A-2001-326826 | 11/2001 |
| JP | A 2002-262304 | 9/2002 |
| JP | A 2002-290759 | 10/2002 |
| JP | A 2003-018415 | 1/2003 |

* cited by examiner

*Primary Examiner*—Twyler L Haskins
*Assistant Examiner*—Michael Burleson
(74) *Attorney, Agent, or Firm*—Oliff & Berridge, PLC

(57) ABSTRACT

An image processing device carries out color conversion of a color value on a first color space into a color value on a second color space. The device includes a first color conversion unit that does not convert a color value corresponding to a gray axis in the first color space and carries out the color conversion so as to adapt a color value on the part other than the gray axis to a color area of the second color space; and a second color conversion unit that adjusts the gray axis in the first color space after the color conversion.

15 Claims, 17 Drawing Sheets

IMAGE PROCESSING DEVICE, COLOR
CONVERSION TABLE CREATING DEVICE,
DISPLAY DEVICE, IMAGE PROCESSING
METHOD, COLOR CONVERSION TABLE
CREATING METHOD, AND METHOD OF
MANUFACTURING DISPLAY DEVICE

This application claims the benefit of Japanese Patent Application No. 2006-101665, filed in the Japanese Patent Office on Apr. 3, 2006. The entire disclosure of the prior application is hereby incorporated by reference herein in its entirety,

BACKGROUND

1. Technical Field

Embodiments of the invention include an image processing device, a color conversion table creating device, a display device, an image processing method, a color conversion table creating method, and a method of manufacturing the display device that color-converts a color value in any color space into a color value in other color space.

2. Related Art

In the past, color matching was widely conducted for assimilating the difference of a color area between a color reproduction space reproducible by a display device such as a projector or a display and a color space (hereinafter, referred to as "target color space") of a display target such as sRGB and achieving a color reproduction in accordance with the target color space by the display device.

As an example of the color matching, if a color value is matched in the overlapped area of the target color space and the color reproduction space by one to one, the color reproduction suitable for the target color space call be carried out. In addition, in order to effectively utilize the high luminance area of the color reproduction spaces the color reproduction may be carried out so as to take advantage of the entire area of the color reproduction space including the high luminance area by matching the color value on the color reproduction space outside the target color space with the color value inside the target color space with respect to the outside of the overlapped area of the target color space and the color reproduction space (for example, see JP-A-2003-18415).

Furthermore, in the technique described in JP-A-2003-18415, the color conversion is carried out under the assumption that a tone characteristic for each primary color of RGBs in the display device before the color conversion is a fixed tone characteristic, for example, $\gamma=2.2$. The color conversion is performed in a color space of a curved gray axis space that comes close to the gray axis of the color reproduction space from the gray axis of the target color space as the brightness increases, it may achieve the color reproduction having the color characteristic that comes entirely close to the target color space while utilizing effectively the high luminance area of the color reproduction space.

However, according to JP-A2003-18415, since the tone characteristic assumed in the first color conversion unit and the tone characteristic adjusted actually in the second color conversion unit are different to each other, the accuracy may be deteriorated.

For example, in the case where the gray axis or the like of the display device before the color conversion is properly corrected in advance and the tone characteristic for each primary color is different to that is assumed at the color conversion, the adjustment accuracy of the gray characteristic deteriorates.

As described above, according to the related art, there was a problem that an accurate adjustment of the gray characteristic is difficult at the matching of the color area.

SUMMARY

Some embodiments provide an image processing device, a color conversion table creating device, a display device, an image processing method, a color conversion table creating method, and a method of manufacturing the display device that can accurately adjust the gray characteristic while matching the color area.

An image processing device according to a first exemplary embodiment carries out color conversion of a color value on a first color space into a color value on a second color space, and the device includes a first color conversion unit that does not convert a color value corresponding to a gray axis in the first color space and carries out the color conversion so as to adapt a color value on the part other than the gray axis to a color area of the second color space; and a second color conversion unit that adjusts the gray axis in the first color space after the color conversion.

With this configuration, since the color value corresponding, to the gray axis in the first color space is not color-converted by the first color conversion unit and is adjusted by the color conversion due to the second color conversion unit, it can obtain the color space in which the gray axis is accurately adjusted. Meanwhile, the color value on the part other than the gray axis in the first color space is adapted to the color area of the second color space by the first color conversion. Accordingly, it can accurately perform the color conversion toward the color space having the adjusted gray axis while adapting to the second color space, as a whole.

In addition, it is preferable that the first color conversion unit does not convert the color value corresponding to the gray axis in the first color space and carries out the color conversion in accordance with a first color conversion table that correlates the color value on, the part other than the gray axis with the color value that adapts the color value on the part other than the gray axis to the color area of the second color space.

With this configuration, it can accurately perform the color conversion toward the color space having the adjusted gray axis while adapting to the second color space by performing the color conversion based on the first color conversion table, as a whole.

A color conversion table creating device according to a second exemplary embodiment creates a color conversion table for performing a color conversion of a color value on a first color space into a color value on a second color space, and the device includes a first color space setting unit that sets a color area of the first color space; and a first color conversion table creating unit that does not convert the color value corresponding to the gray axis in the set color area of the first color space and creates a first color conversion table that correlates the color value on the part other than the gray axis with the color value that adapts the color value on the part other than the gray axis to the color area of the second color space.

With this configuration, it can obtain the color conversion table that adapts the color value on the part other than the gray axis in the color area of the set first color space to the color area of the second color space without changing the color value corresponding to the gray axis in the first color space. Since the color value on the gray axis is not converted, the space that is color-converted by the first color conversion table has no influence on the gray axis. Accordingly, it can obtain the color area adapted to the color area of the second color space.

In addition, it is preferable that the color conversion table creating device further includes a second color conversion table acquiring unit that acquires a second color conversion table of the color conversion adjusting the gray axis with respect to the color value on the first color space.

With this configuration, since the gray axis can be adjusted by the second color conversion table without being influenced by the color conversion of the first color conversion table, it can obtain the first color conversion table and the second color conversion table capable of adapting the color area of the first color space to the color area of the second color space while adjusting accurately the gray axis.

In addition, it is preferable that the first color conversion table creating unit converts the color value on the first color space into the color value on the color space of a device-independent color space from a device-dependent color space, and in the device-independent color space, does not convert the corrected color value on the gray axis by correcting the color value on the gray axis in the first color space to the color value on the gray axis adjusted by the second color conversion table in the second color space.

With this configuration, the gray axis in the first color space is corrected to the adjusted gray axis by the second color conversion table in the device-independent color space, and the color value on the corrected gray axis is not converted. Accordingly, the color value on the gray axis of the first color space is not converted in the device-independent color space. As a result, it can accurately obtain the color conversion table that adapts the color value on the part other than gray axis to the color area of the second color space while not converting the color value on the gray axis.

In addition, it is preferable that the first color conversion table creating unit correlates, for the color value on the part other than the gray axis in the first color space) the color value closer to the gray axis of the first color space with the color value closer to the gray axis in the second color space, in the device-independent color space.

With this configuration, since for the color value on the part other than the gray axis, the color value closer to the gray axis of the first color space is converted into the color value closer to the gray axis in the second color space, it can obtain the color conversion table that converts into the color space of which the color value continues from the gray axis of the first color space to the second color space.

In addition, it is preferable that the first color conversion table creating unit carries out the color conversion toward the second color space from the device-independent color space in consideration of the output characteristic of a display device after the application of the second color conversion table.

With this configuration, the accuracy of the color conversion increases in consideration of the output characteristic of the display device in which the gray axis is adjusted, and it can obtain the color conversion table that achieves the further suitable color reproduction.

In addition, it is preferable that the first color conversion table creating unit correlates the color value about the color value on the part other than the gray axis in the first color space so as to come the color value of low saturation close to the color value on the first color space and to come the color value of high saturation close to the color value on the second color space.

With this configuration, since the low saturation area corresponds to the first color space while the high saturation area comes close to the second color space, it can obtain the color conversion table that balances the color space of the color area close to the second color space with the color reproduction close to the color area of the set first color space.

In addition, it is preferable that the first color conversion table creating unit correlates the outermost color value of the color area in the first color space with the outermost color value of the color area in the second color space.

With this configuration, since the entire color area of the first color space and the entire color area of the second color space correspond to each other, it can obtain the color conversion table that achieves the color reproduction close to the first color space while taking advantage of the entire color area of the second color space.

In addition, it is preferable that the first color conversion table creating unit converts the color value on the first color space into the color value on HSI color space to correlate the color value in the HSI color space.

With this configuration, since the correlation is performed in the HSI color space, it can easily perform the conversion relative to the color value on the part other than the gray axis.

In addition, it is preferable that the first color conversion table creating unit carries out the color conversion toward the second color space from the HSI color space in consideration of the output characteristic of the display device after the application of the second color conversion table.

With this configuration, the accuracy of the color conversion increases in consideration of the output characteristic of the display device in which the gray axis is adjusted, and it can obtain the color conversion table that achieves the further suitable color reproduction.

In addition, it is preferable that the first color conversion table creating unit can adjust the range of the color value of the high saturation.

With this configuration, it can achieve a prescribed color reproduction by adjusting the range of the color area close to the second color space and the range of the color area close to the first color space.

In addition, it is preferable that the first color conversion table creating unit can adjust the change amount of a hue by the color conversion of the first color conversion table.

With this configuration, it can achieve a prescribed color reproduction by adjusting the change amount of the hue at the color conversion.

According to a third exemplary embodiment, there is provided a display device including the image processing device of the first and second exemplary embodiments.

With this configuration, it can accurately perform the color conversion toward the color space having the adjusted gray axis while adapting to the second color space, as a whole.

According to a fourth exemplary embodiment, there is provided an image processing method which carries out color conversion of a color value on a first color space into a color value on a second color space, and the method includes a first color conversion process that does not convert a color value corresponding to a gray axis in the first color space and carries out the color conversion so as to adapt a color value on the part other than the gray axis to a color area of the second color space; and a second color conversion process that adjusts the gray axis in the first color space after the color conversion.

In addition, according to a fifth exemplary embodiment, there is provided a color conversion table creating method which creates a color conversion table for performing a color conversion of a color value on a first color space into a color value on a second color space, and the method includes a first color space setting process that sets a color area of the first color space; and a first color conversion table creating process that does not convert the color value corresponding to the gray axis in the set color area of the first color space and creates a first color conversion table that correlates the color value on the part other than the gray axis with the color value that adapts the color value on the part other than the gray axis to the color area of the second color space.

Furthermore, according to a sixth exemplary embodiment, there is provided a method of manufacturing a display device which carries out color conversion in accordance with a color conversion table, and the method includes a first color space setting process that sets a color area of the first color space; a first color conversion table creating process that does not convert the color value corresponding to the gray axis in the set color area of the first color space and creates a first color conversion table that correlates a color value on the part other than the gray axis with a color value that adapts the color value on the part other than the gray axis to the color area of the second color space; and a table storing process that stores the created first color conversion table in the display device.

BRIEF DESCRIPTION OF THE DRAWINGS

Exemplary embodiments of invention will be described with reference to the accompanying drawings, wherein like numbers reference like elements.

DESCRIPTION OF EXEMPLARY EMBODIMENTS

First Exemplary Embodiment

Hereinafter, a first exemplary embodiment will be described with reference to the accompanied drawings.

Figure 1:
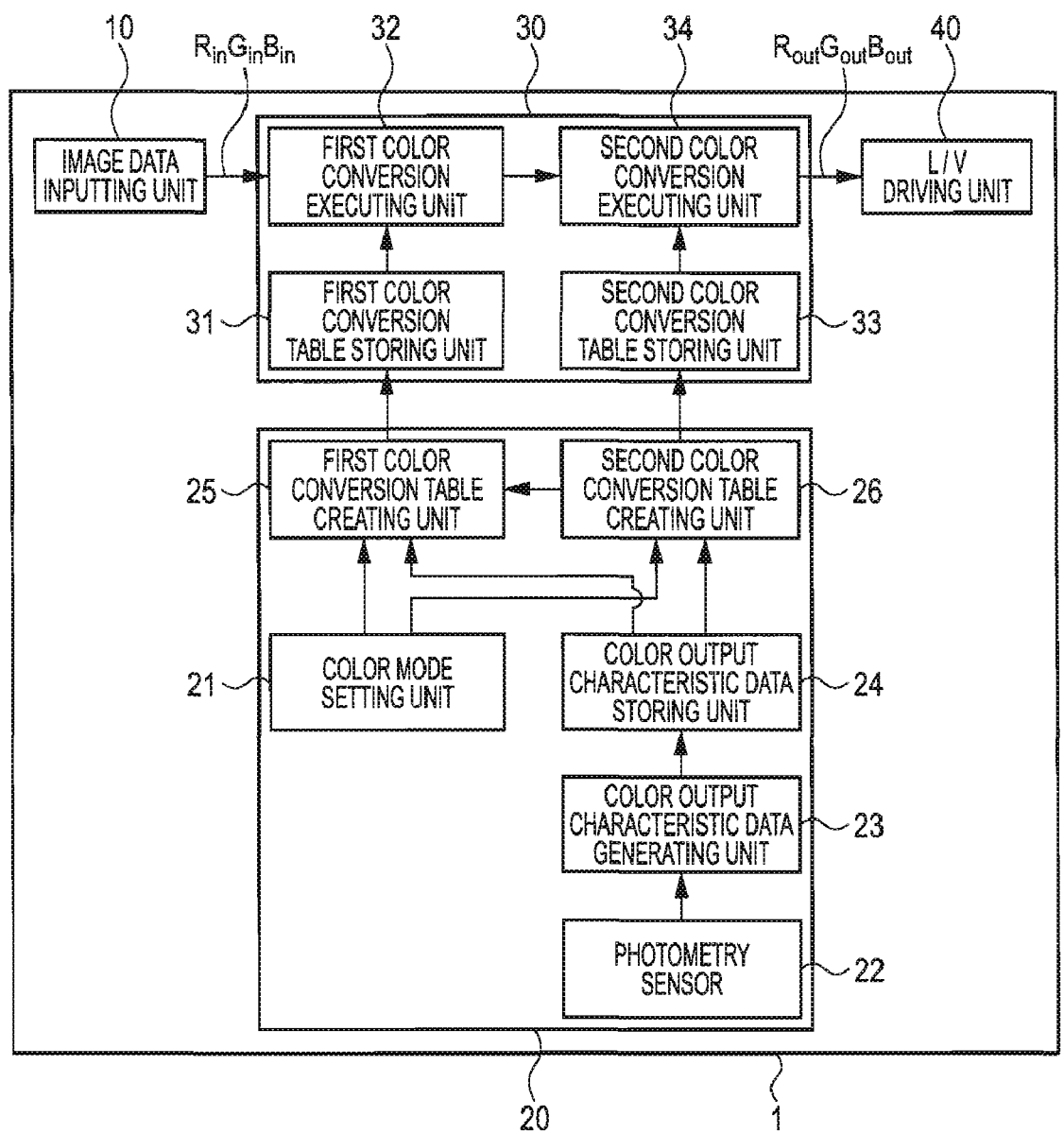
FIG. 1 is a block diagram showing a structure of a projector according to a first exemplary embodiment.

FIG. 1 is a flowchart showing a structure of a projector according to the first exemplary embodiment. As shown in FIG. 1, the projector 1 includes an image data inputting unit 10 that receives the input of an image data, a color conversion table creating unit 20 that creates a color conversion table, an image processing unit 30 that converts the color into the image data with reference to the color conversion table, an L/V driving unit 40 that drives light valve (not shown) as a space light modulator in accordance with the data after the color conversion so as to project the image to display. This projector 1 modulates light from light source (not shown), such as a metal hydride lamp, high pressure mercury lamp, or LED by the light valve driven by the L/V driving unit 40 so that the magnification projection is performed on a screen or a wall by a projection lens not shown in FIG. 1 similarly.

The image data inputting unit 10 receives the input of the image data from external equipment or the like and conducts an input process and transfers the image data to the image processing unit 30 as an input value $R_{in}G_{in}B_{in}$ of a prescribed data type.

The color conversion table creating unit 20 includes a color mode setting unit 21 that sets a color mode, a photometry sensor 22, a color output characteristic data generating unit 23, a color output characteristic data storing unit 24 that stores the color output characteristic data, a first color conversion table creating unit 25, and a second color conversion table creating unit 26. The color output characteristic data generating unit 23 represents a color output characteristic of the projector 1 from measurement value of the photometry sensor 22, the first color conversion table creating unit 25 creates three dimensional color conversion table for color matching (hereinafter, referred to as "first color conversion table"), and the second color conversion table creating unit 26 creates one dimensional color conversion table (hereinafter, referred to as "second color conversion table") adjusting tone characteristic for each color of RGBs corresponding to the adjustment of a gray axis and the output characteristic of the display device.

The color mode setting unit 21 sets one color mode among a predetermined plural color modes such as a color priority mode or brightness priority mode and sets, for example, a color area (hereinafter, referred to as "target color area") of a target color space (first color space) in accordance with the set color mode.

The first color conversion table creating unit 25 performs a gray axis correction and a saturation and hue correction with respect to the target color area. Moreover, the first color conversion table creating unit 25 creates the first color conversion table reflecting the corrected results.

Here, the gray axis correction means that the gray axis of the target color space is corrected to the gray axis in the color area (hereinafter, referred to as "color reproduction area") of the color reproduction space (second color space) that can be reproduced by the projector 1, on device-independent Yuv color space that does not depend on the output characteristic of the display device. More specifically, on Yuv color space, color value on the gray axis of the target color space is corrected to the gray value of the color reproduction space when the second color conversion table is applied without performing the gray axis correction and the saturation and hue correction. Furthermore, the gray axis means the axis on the color space that mutually links color points of the color value corresponding to gray signals D (=$R_{in}$= $G_{in}$=$B_{in}$) having the same input value R, G and B. In addition, "at the non-correction" referred to the following description means the state where the gray axis and the tone characteristic for each color of RGBs are adjusted when the only second color conversion table is applied without performing the gray axis correction and the saturation and hue correction.

The saturation and hue correction adapts the color value on the part other than the gray axis to the color reproduction area as for the color value on the target color area after the gray axis correction. More specifically, on the device-dependent HSI color space, the color value on the part other than the gray axis of the target color space after the gray axis correction is converted so as to come the low saturation area close to the color value of the target color area and to come the high saturation area close to the color value of the color reproduction area, and the color value on the gray axis is not converted.

That is, the target color area is corrected to the color space having the gray axis at the non-correction by the gray axis correction, on the Y*u*v* color space, and the target color correction is adapted to the color reproduction area without changing the gray axis on HSI color space. For this reason, the color reproduction is matched to the target color area. Therefore, the color space having the color reproduction area in which the projector can be exhibited is produced, as a whole.

Moreover, the first color conversion table creating unit 25 creates a first color conversion table that corresponds the color value of the target color area to the color value of the color space in which the gray axis and the saturation and hue have been corrected.

The second color conversion table creating unit 26 creates a second color conversion table about the color value corrected by a first color conversion executing unit 32 such that one dimensional Color conversion is preformed toward each color of the RGBs adjusting the gray axis and the tone characteristic of each color of the RGBs in consideration of the color output characteristic of the projector 1.

The image processing unit 30 includes a first color conversion table storing unit 31 that stores the first color conversion table, a first color conversion executing unit 32 that executes three dimensional color conversion into the input value $R_{in}$ $G_{in}B_{in}$ on the basis of the first color conversion table, a second color conversion table storing unit that stores the second color conversion table, and a second color conversion executing unit 34 that executes one dimensional color conversion into the color value after three dimensional color conversion on the basis of the second color conversion table. For this reason, the image processing unit 30 performs three dimensional color conversion and one dimensional color conversion with respect to the input value $R_{in}G_{in}B_{in}$ to convert into the output value $R_{out}G_{out}B_{out}$.

The L/V driving unit 40 receives the output value $R_{out}G_{out}$ $B_{out}$ from the image processing unit 30 and transmits the driving signal to the light valve in accordance with the output value $R_{out}G_{out}B_{out}$. Accordingly, the driving of the light valve is controlled. For this reason, the image is output to the light valve in accordance with the output value $R_{out}G_{out}B_{out}$, and the image on the light valve is projected on, for example, the screen to be displayed.

As described above, the projector 1 according to this exemplary embodiment creates the first color conversion table of the gray axis correction and the saturation and hue correction and the second color conversion table for adjusting the output depending on the projector 1. Moreover, the color conversion is performed while reflecting the gray axis correction and the saturation and hue correction in accordance with the created tables.

Next, the process in case where the color conversion table creating unit 20 creates the color conversion table will be described in detail with reference to the flowchart shown in FIG. 2.

When the process starts, in step S100, the color mode setting unit 21 sets one color mode among a predetermined plural color modes such as a color priority mode or brightness priority mode. Here, the target color area and γ value have been set in each color mode. Therefore, the target color area and the γ value of the color mode are set by setting the color mode. For example, when it is set to the color mode of the color area based on sRGB standard, the color space having the following chromaticity coordinate is set to the target color area. That is, the chromaticity coordinate of white ($R_{max}G_{max}$, $B_{max}$) is "x=0.313, y=0.329", the chromaticity coordinate of red ($R_{max}$, 0, 0) is "x=0.640, y=0.330", the chromaticity coordinate of green (0, 0, $G_{max}$, 0) is "x=0.300, y=0.600", and the chromaticity coordinate of blue (0, 0, $B_{max}$) is "x=0.150, y=0.060".

Next, in step S110, the second color conversion executing unit 34 reads out the second color conversion table corresponding to the set color mode to obtain from the second color conversion table storing unit 33, Furthermore, the second color conversion table is set in each color mode in advance and is stored in the second color conversion table storing unit 33. Hereinafter, the process carried out in the case where the color conversion table is created will be described.

Second Color Conversion Table Creating Process

Figure 3:
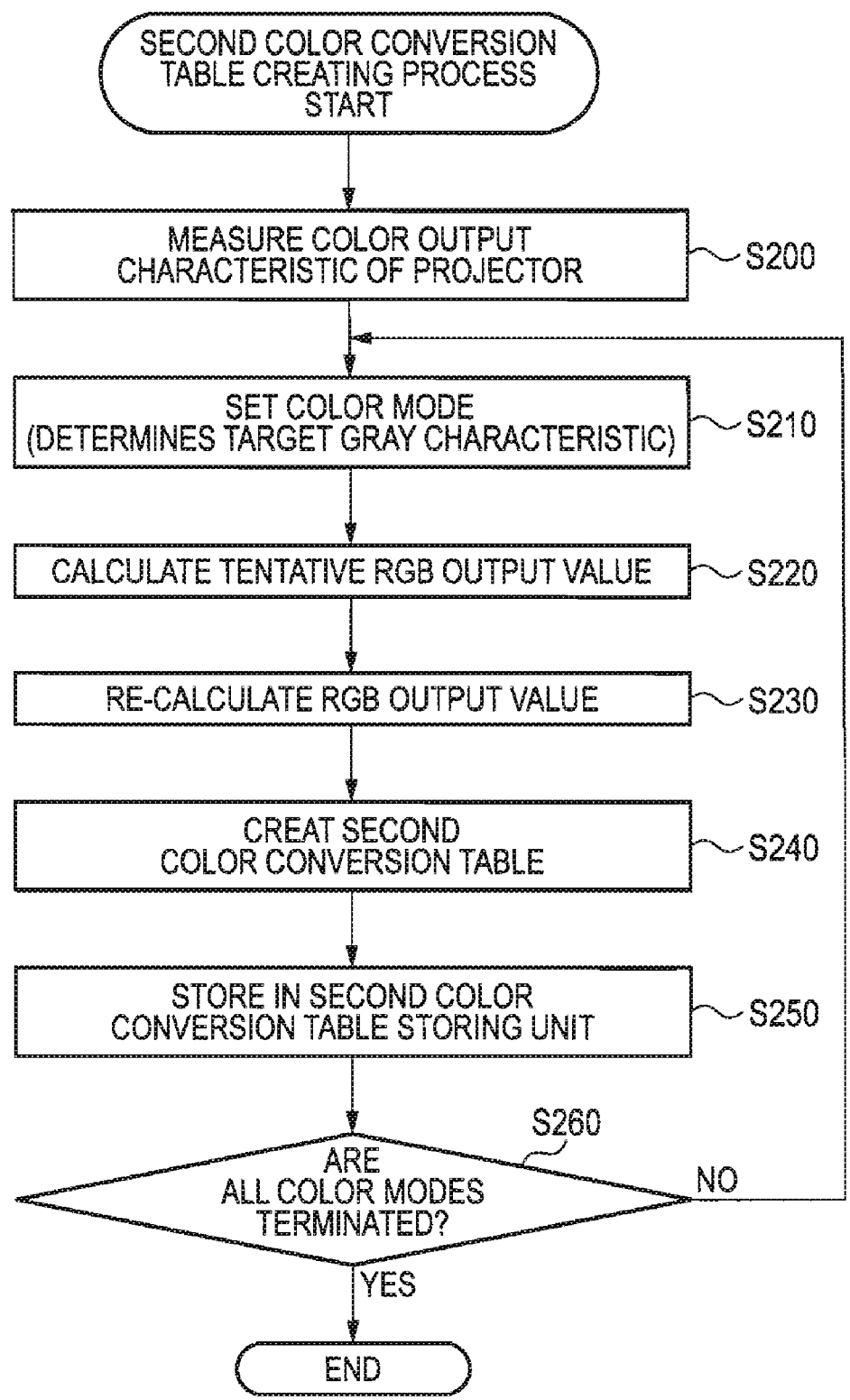
FIG. 3 is a flowchart showing a processing when a second color conversion

FIG. 3 is a flowchart showing the flow of a second color conversion table creating process. When the second color conversion table creating process is started in step S200, the color output characteristic data generating unit 23 makes the screen of a prescribed color project on a reference projection side in the projector 1 and makes the color output characteristic of projector 1 measure in the photometry sensor 22. At this time, the photometry sensor 22 measures the XYZ value of each tone when a monochrome output value $R_{out}$, $G_{out}$ and $B_{out}$ is output to projector 1. For example, tristimulus values $X_D$ ($R_{out}$, 0, 0), $Y_D$ ($R_{out}$, 0, 0), and $Z_D$ ($R_{out}$, 0, 0) are measured for red output value ($R_{out}$, 0, 0) in a red case.

Furthermore, the color output characteristic data generating unlit 23 outputs a red output value $R_{max}G_{max}B_{max}$ to the L/V driving unit 40 and makes luminance $Y_D$ ($R_{max}$, $G_{max}$, $B_{max}$) measure in the photometry sensor 22. In this regard, $R_{max}$, $G_{max}$, and $B_{max}$ are the maximum value where each tone value of the output values $R_{out}$, $G_{out}$, and $B_{out}$ can be taken.

Moreover, the color output characteristic data that shows the color output characteristic of projector 1 is generated by the measured XYZ value. For example, as for the red, the color output characteristic data $X_{RD}Y_{RD}Z_{RD}$ normalizing XYZ value at the outputting of the red output value $R_{out}$ by the luminance $Y_D$ ($R_{max}$, $G_{max}$, $B_{max}$) at the outputting of the red output value $R_{out}$ is calculated by the following, Expression 1. When the similar calculation is also conducted about the green and blue, it may obtain the color output characteristic data $X_{RD}Y_{RD}Z_{RD}$, $X_{GD}Y_{GD}Z_{GD}$, and $X_{BD}Y_{Bd}Z_{BD}$ of each color of RGBs. The color output characteristic data shows the XYZ value of the color displayed actually when the image processing unit 30 outputs the output value $R_{out}$, $G_{out}$, and $B_{out}$.

$$\begin{pmatrix} X_{RD}(R_{out}) \\ Y_{RD}(R_{out}) \\ Z_{RD}(R_{out}) \end{pmatrix} = \begin{pmatrix} \{X_D(R_{out}, 0, 0) - X_D(0, 0, 0)\} / \\ \{Y_D(R_{max}, G_{max}, B_{max}) - Y_D(0, 0, 0)\} \\ \{Y_D(R_{out}, 0, 0) - Y_D(0, 0, 0)\} / \\ \{Y_D(R_{max}, G_{max}, B_{max}) - Y_D(0, 0, 0)\} \\ \{Z_D(R_{out}, 0, 0) - Z_D(0, 0, 0)\} / \\ \{Y_D(R_{max}, G_{max}, B_{max}) - Y_D(0, 0, 0)\} \end{pmatrix} \quad (1)$$

Next, in step S210, the second color conversion table creating unit 26 sets the color mode and determines a prescribed target gray characteristic $X_D(D) Y_D(D) Z_D(D)$ corresponding to the set color mode. For example, if assumed that the target gray characteristic has a constant chromaticity according to γ value which is set based on to the color mode, the target gray characteristic $Y_D(D)$ is determined by the following Expression 2. Here, the target gray characteristics $X_D(D)$, $Y_D(D)$, and $Z_D(D)$ have a prescribed value that is properly set, respectively. In this regard, D means each of the tones ($D=R_{in}=G_{in}=B_{in}$) on the gray axis, and $D_{max}$ means the maximum value where the tone can be taken. However, the target gray characteristic is not limited thereto, but may have a sigmoid characteristic different to every $X_D(D)$, $Y_D(D)$ and $Z_D(D)$.

$$Y_D(D) = (D/D_{max})^\gamma \quad (2)$$

Next, in step S220, the second color conversion table creating unit 26 calculates the output value $R_{out}G_{out}B_{out}$ for displaying the target gray characteristic $X_D(D) Y_D(D) Z_D(D)$. As a result, first, a conversion matrix $N_0$ is obtained in accordance with the following Expression 3 by using the color output characteristic data $X_{RD}Y_{RD}Z_{RD}$, $X_{GD}Y_{GD}Z_{GD}$, and $X_{BD}Y_{BD}Z_{BD}$ calculated in step S200.

$$N_0 = \begin{pmatrix} X_{RD}(R_{max}) & X_{GD}(G_{max}) & X_{BD}(B_{max}) \\ Y_{RD}(R_{max}) & Y_{GD}(G_{max}) & Y_{BD}(B_{max}) \\ Z_{RD}(R_{max}) & Z_{GD}(G_{max}) & Z_{BD}(B_{max}) \end{pmatrix} \quad (3)$$

Moreover, since the gray characteristic $X_D(D) Y_D(D) Z_D(D)$ is inversely converted by an inverse matrix $N_0^{-1}$ of the conversion matrix $N_0$ in accordance with the following Expression 4, each color luminance $Y_{RD}(R_{out0}) Y_{GD}(G_{out0}) Y^{BD}(B_{out0})$ of RGB is calculated. Then, the calculated color luminance $Y_{RD}(R_{out0}) Y_{GD}(G_{out0}) Y_{BD}(B_{out0})$ is a tentative output value $R_{out0}G_{out0}B_{out0}$ (Expression 5).

$$\begin{pmatrix} Y_{RD}(R_{out0}) \\ Y_{GD}(G_{out0}) \\ Y_{BD}(B_{out0}) \end{pmatrix} = N_0^{-1} \begin{pmatrix} X_D(D) \\ Y_D(D) \\ Z_D(D) \end{pmatrix} \quad (4)$$

$$(R_{out0}, G_{out0}, B_{out0}) = (Y_{RD}(R_{out0}), Y_{GD}(R_{out0}), Y_{BD}(R_{out0})) \quad (5)$$

Next, in step S230, the second color conversion table creating unit 26 recalculates the RGB output value. Since an error caused by the chromaticity change in a monochrome RGB is suppressed by using the conversion matrix of Expression 3 when the RGB value is the maximum, the RGB output value is recursively calculated by using the tentative output value $R_{out0}G_{out0}B_{out0}$. Accordingly, the conversion accuracy is improved. More specifically, the luminance $Y_{RD}(R_{out1})$ $Y_{GD}(G_{out1}) Y_{BD}(B_{out1})$ is calculated in accordance with the following Expressions 6 to 8. For this reason, it may obtain an output value $R_{out1}G_{out1}B_{out1}$ corresponding to the prescribed target gray characteristic. Moreover, it is used here in the recursive calculation in which the calculation of the RGB is repeated twice, but it may also be usable that in which the calculation of the RGB is repeated more than two times.

$$N_1 = \begin{pmatrix} X'_{RD}(R_{out0}) & X'_{GD}(G_{out0}) & X'_{BD}(B_{out0}) \\ Y'_{RD}(R_{out0}) & Y'_{GD}(G_{out0}) & Y'_{BD}(B_{out0}) \\ Z'_{RD}(R_{out0}) & Z'_{GD}(G_{out0}) & Z'_{BD}(B_{out0}) \end{pmatrix} \quad (6)$$

$$\begin{pmatrix} X'_{RD}(R_{out0}) \\ Y'_{RD}(R_{out0}) \\ Z'_{RD}(R_{out0}) \end{pmatrix} = \frac{Y_{RD}(R_{max})}{Y_{RD}(R_{out0})} \begin{pmatrix} X_{RD}(R_{out0}) \\ Y_{RD}(R_{out0}) \\ Z_{RD}(R_{out0}) \end{pmatrix} \quad (7)$$

$$\begin{pmatrix} Y_{RD}(R_{out1}) \\ Y_{GD}(G_{out1}) \\ Y_{BD}(B_{out1}) \end{pmatrix} = N_1^{-1} \begin{pmatrix} X_D(D) \\ Y_D(D) \\ Z_D(D) \end{pmatrix} \quad (8)$$

$$(R_{out1}, G_{out1}, B_{out1}) = (Y_{RD}(R_{out1}), Y_{GD}(R_{out1}), Y_{BD}(R_{out1})) \quad (9)$$

Next, in step S240, the second color conversion table creating unit 26 creates the second color conversion table that correlates each of the tone values D ($=R_{in}=G_{in}=B_{in}$) on the gray axis with the corresponding output values $R_{out1}$, $G_{out1}$, $B_{out1}$.

Next, in step S250, the second color conversion table creating unit 26 stores the created second color conversion table in the second color conversion storing unit 33.

Next, in step S260, it is judged whether or not all color modes are processed. If all color modes are not processed (No), it returns to step S210 to process an unprocessed color mode. As for all color modes, if the process for creating the second color conversion table is terminated (Yes), the second color conversion table creating process is terminated.

Figure 4:
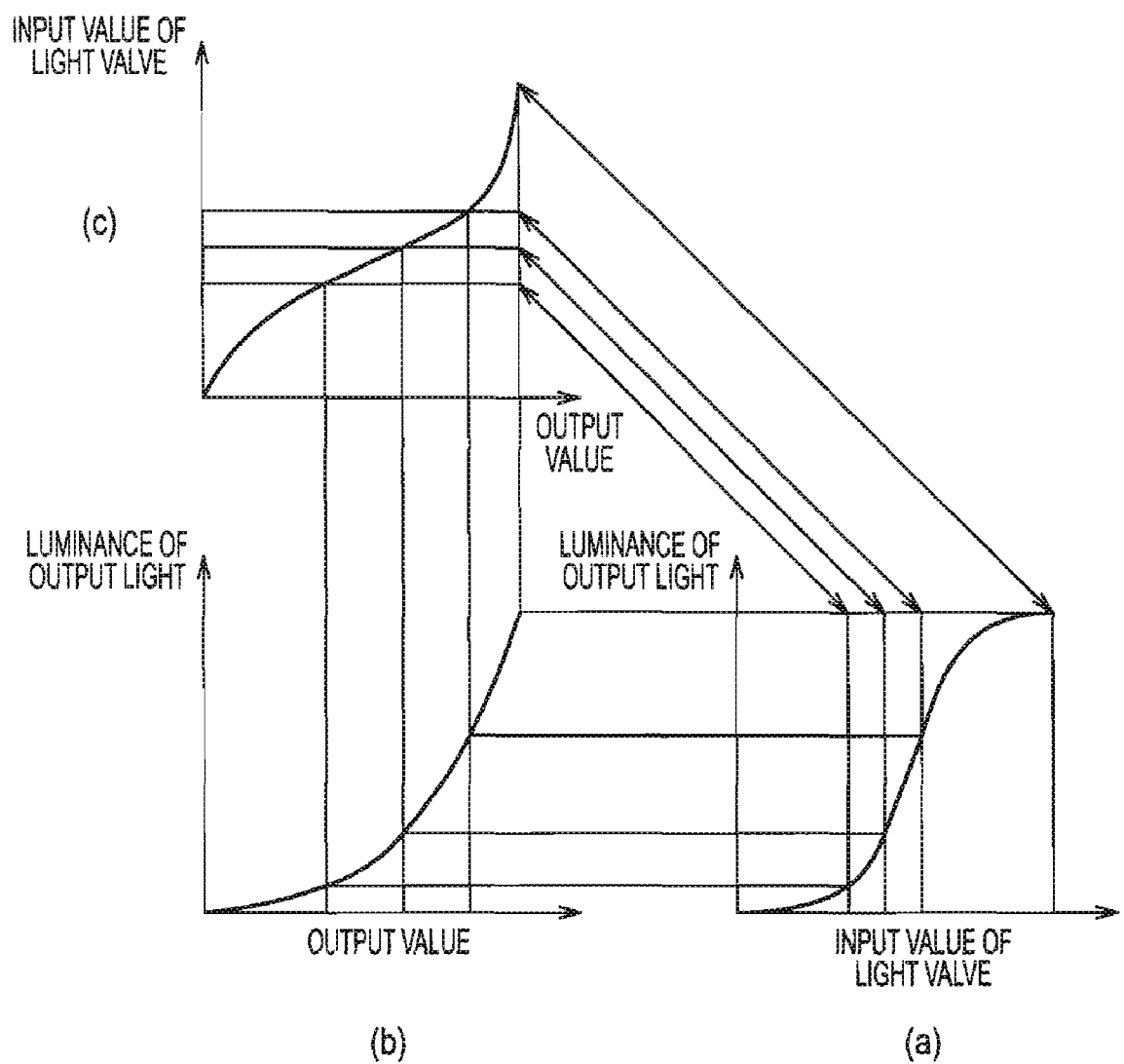
FIG. 4 is an explanatory view explaining a color conversion by the second color conversion table.

FIG. 4 is a view explaining a color conversion by the second color conversion table. First, as shown in (a) in FIG. 4, since the light valve has device characteristic, the input value into the light valve and the luminance of the actual output light have nonlinear characteristic. Therefore, in order to have a γ curved characteristic shown in (b) in FIG. 4 as a target gray characteristic of the light valve, it is necessary to perform the tone conversion with respect to the output value of the image processing unit 30, as shown in (c) in FIG. 4, since the target gray characteristic indicated in Expression 2 recursively shows by Expressions 3 to 9 in the second color conversion table creating process, when the color conversion is performed by the second color conversion table with respect to the output value, it may obtain the output value of the γ curved output characteristic having the target gray characteristic as shown in (b) in FIG. 4. That is, the second color conversion table is to convert into the output value which corresponds to the target gray characteristic, and in which the output characteristic of the light valve is considered.

Figure 2:
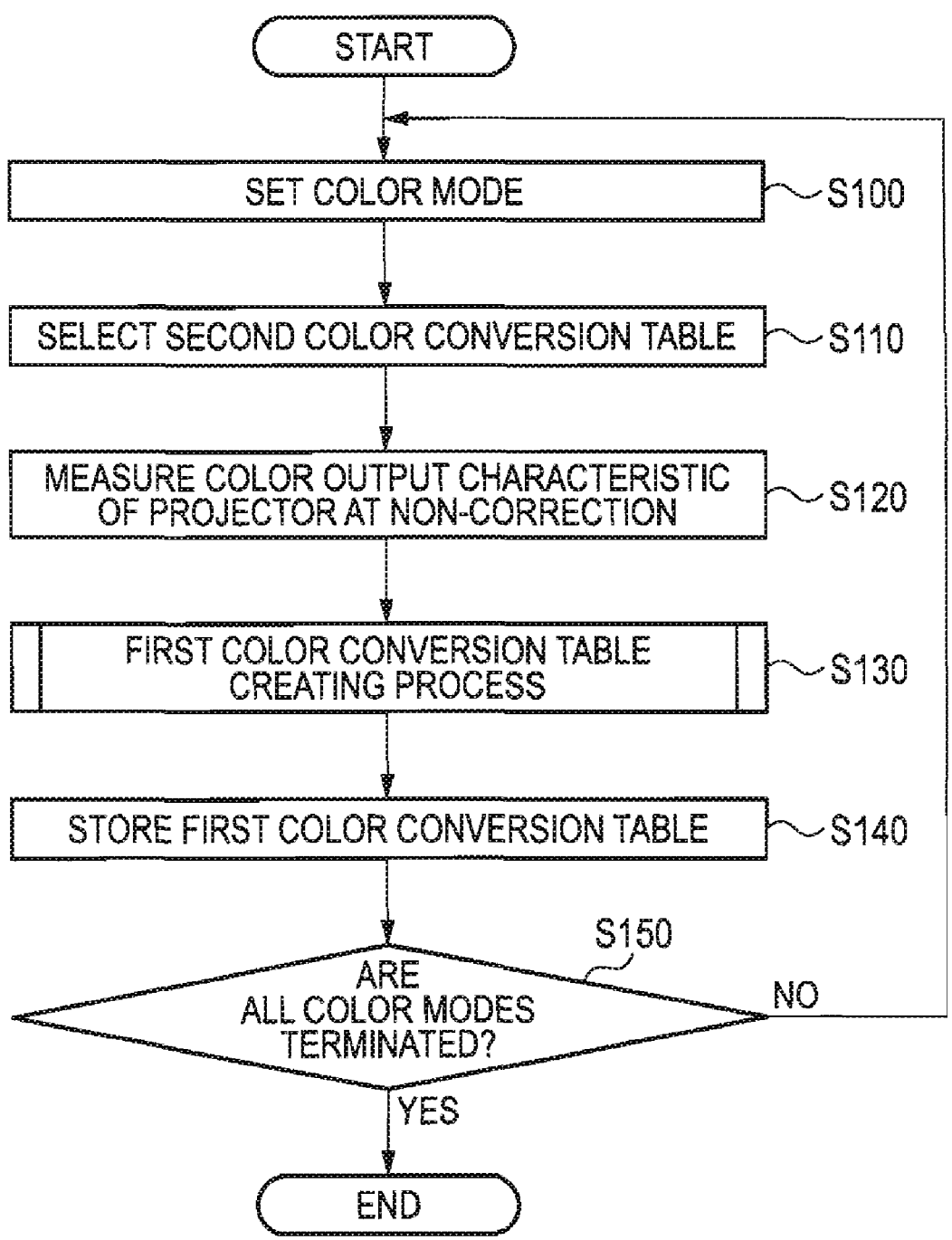
FIG. 2 is a flowchart showing a processing when a color conversion table is created.

According to this exemplary embodiment, the above second color conversion table creating process is executed in advance by the process of FIG. 2, and the created second color conversion table is stored In the second color conversion table storing unit 33. Moreover, in step S110, the second color conversion table is obtained by reading out the second color conversion table created beforehand from the second color conversion table storing unit 33. However, it may execute the second color conversion table creating process shown in FIG. 3 at the timing of step S110.

Next, in step S120, the color output characteristic data generating unit 23 outputs the output value to which the second color conversion table is applied, and measures the color output data at the non-correction. More specifically, after the output value to which the second color conversion table is applied to the monochrome RGB value and the white RGB value is output, the XYZ value of each tone for each color of RGBs and the white luminance Y ($R_{max}$, $G_{max}$, $B_{max}$) is measured by the photometry sensor 22. Moreover, for example, as for the red, the color output characteristic data $X_R Y_R Z_R$ at the non-correction that normalizes the red color output characteristic by the white luminance is calculated by the following Expression 10. In the same way, the green color output characteristic data $X_G Y_G Z_G$ and the blue color output characteristic data $X_B Y_B Z_B$ are calculated, and the color output characteristic data $X_R Y_R Z_R$, $X_G Y_G Z_G$, $X_B Y_B Z_B$ is stored in the color output characteristic data storing unit 24.

$$\begin{pmatrix} X_R(R) \\ Y_R(R) \\ Z_R(R) \end{pmatrix} = \begin{pmatrix} \{X(R,0,0) - X(0,0,0)\}/\{Y(R_{max}, G_{max}, B_{max}) - Y(0,0,0)\} \\ \{Y(R,0,0) - Y(0,0,0)\}/\{Y(R_{max}, G_{max}, B_{max}) - Y(0,0,0)\} \\ \{Z(R,0,0) - Z(0,0,0)\}/\{Y(R_{max}, G_{max}, B_{max}) - Y(0,0,0)\} \end{pmatrix} \quad (10)$$

Next, in step S130, the first color conversion table creating unit 25 conducts the first color conversion table creating process.

First Color Conversion Table Creating Process

Hereinafter, the first color conversion table creating process will be described with reference to the flowchart shown in FIG. 5. When the first color conversion table creating process is started, first, in step S300, an input value $R_t G_t B_t$ on the target color space is converted into an input value $L_t^* u_t^* v_t^*$ on a L*u*v* color space of the device-independent color space. For this reason, the input value $R_t G_t B_t$ is converted into an input value $X_t Y_t Z_t$ on the XYZ color space by the calculation of the following Expressions 11 to 14. In this regard, $x_R y_R z_R$, $x_G y_G z_G$, $x_B y_B z_B$, and $x_W y_W z_W$ are the chromaticity coordinate of the red, green, and white in the target color space, respectively.

$$\begin{aligned} r &= (R/R_{max})^\gamma \\ g &= (G/G_{max})^\gamma \\ b &= (B/B_{max})^\gamma \end{aligned} \quad (11)$$

$$\begin{pmatrix} X \\ Y \\ Z \end{pmatrix} = M \begin{pmatrix} r \\ g \\ b \end{pmatrix} \quad (12)$$

$$M = \begin{pmatrix} T_R & 0 & 0 \\ 0 & T_G & 0 \\ 0 & 0 & T_B \end{pmatrix} \begin{pmatrix} x_R & x_G & x_B \\ y_R & y_G & y_B \\ z_R & z_G & z_B \end{pmatrix} \quad (13)$$

$$\begin{pmatrix} T_R \\ T_G \\ T_B \end{pmatrix} = \begin{pmatrix} x_R & x_G & x_B \\ y_R & y_G & y_B \\ z_R & z_G & z_B \end{pmatrix}^{-1} \begin{pmatrix} x_W/y_W \\ y_W/y_W \\ z_W/y_W \end{pmatrix} \quad (14)$$

Furthermore, the input value $X_t Y_t Z_t$ is converted into the input value $L_t^* u_t^* v_t^*$ on the L*u*v* color space by the calculation of the following Expressions 15 to 17. Moreover, the XYZ value of the white on the target color space is used in the XYZ value $X_W Y_W Z_W$ of the reference white at the conversion.

$$\begin{aligned} u'_W &= 4X_W/(X_W + 15Y_W + 3Z_W) \\ v'_W &= 9Y_W/(X_W + 15Y_W + 3Z_W) \end{aligned} \quad (15)$$

$$u' = \begin{cases} u'_W & (X = Y = Z = 0) \\ 4X/(X + 15Y + 3Z) & (上記以外) \end{cases} \quad (16)$$

$$v' = \begin{cases} v'_W & (X = Y = Z = 0) \\ 9Y/(X + 15Y + 3Z) & (上記以外) \end{cases}$$

$$L^* = \begin{cases} 903.3(Y/Y_W) & (Y/Y_W \leq 0.008856) \\ 116(Y/Y_W)^{1/3} - 16 & (Y/Y_W > 0.008856) \end{cases}$$

$$\begin{aligned} u^* &= 13L^*(u' - u'_W) \\ v^* &= 13L^*(v' - v'_W) \end{aligned} \quad (17)$$

Gray Axis Correction

Figure 6:
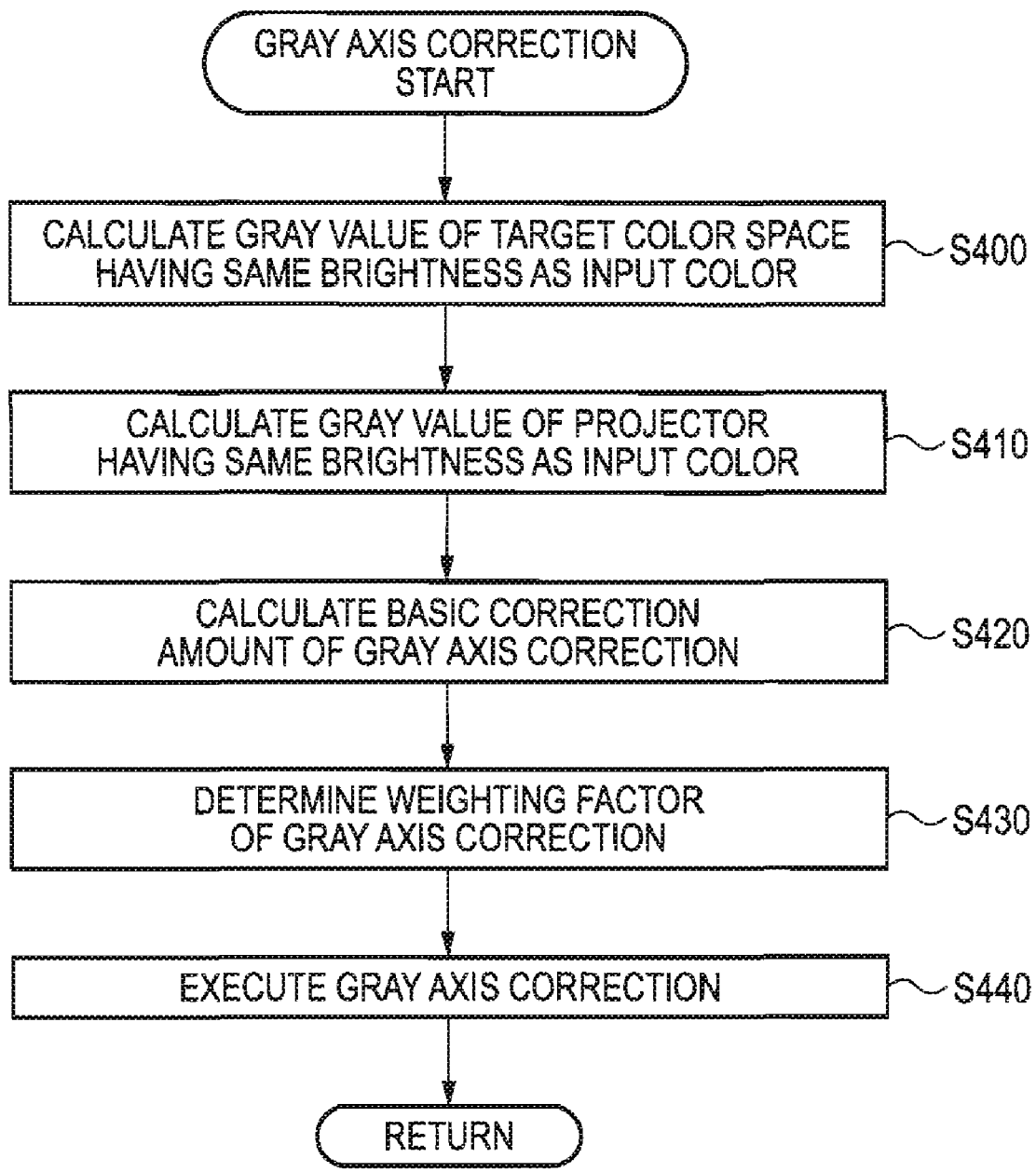
FIG. 6 is a flowchart showing a flow of gray axis correction.

Next, in step S310, the first color conversion table creating unit 25 conducts the gray axis correction. The gray axis correction is conducted by the color conversion according to the following basic Expression 18 of the gray axis correction. Here, $\Delta L_g^* \Delta u_g^* \Delta v_g$ is a basic correction amount of the gray axis correction, and $W_g$ is a weighting factor based on the basic correction amount. The gray axis correction is conducted by calculating Expression 18, after seeking the basic correction amount $\Delta L_g^* \Delta u_g^* \Delta v_g^*$ and the weighting factor $W_g$. The gray axis correction will be described hereinafter with reference to the flowchart shown in FIG. 6.

$$\begin{pmatrix} L_{d1}^* \\ u_{d1}^* \\ v_{d1}^* \end{pmatrix} = \begin{pmatrix} L_t^* \\ u_t^* \\ v_t^* \end{pmatrix} + W_g \begin{pmatrix} \Delta L_g^* \\ \Delta u_g^* \\ \Delta v_g^* \end{pmatrix} \quad (18)$$

When the gray axis correction is started, the gray value having the same brightness as the input value $R_t G_t B_t$ is calculated in step S400. Therefore, the input value $R_t G_t B_t$ is converted into an input value $I_t S_t H_t$ on the HSI color space.

$$\begin{aligned} r &= (R/255)^\gamma \\ g &= (G/255)^\gamma \\ b &= (B/255)^\gamma \end{aligned} \quad (19)$$

$$\begin{aligned} m^+ &= \max(r, g, b) + \min(r, g, b) \\ m^- &= \max(r, g, b) - \min(r, g, b) \end{aligned} \quad (20)$$

$$I = m^+/2 \quad (21)$$

$$S = \begin{cases} m^-/m^+ & (0 < I \leq 0.5) \\ m^-/(2 - m^+) & (0.5 < I < 1) \\ 0 & (I = 0, 1) \end{cases} \quad (22)$$

$$H = \begin{cases} (g - b)/m^- & (r = \max(r, g, b)) \\ (b - r + 2)/m^- & (g = \max(r, g, b)) \\ (r - g - 2)/m^- & (b = \max(r, g, b)) \\ 値なし & (S = 0) \end{cases} \quad (23)$$

When the input value $I_t S_t H_t$ is calculated, a gray value $I_{tg} S_{tg} H_{tg}$ of the target color space having the same brightness as the input value $I_t S_t H_t$ is converted into a gray value $L_{tg}^* u_{tg}^* v_{tg}^*$ of the L*u*v* color space. Accordingly, after calculating the gray value $I_{tg} S_{tg} H_{tg}$ by the following Expression 24, it is converted into the RGB value by Expressions 25 to 27 and converted into the XYZ value by Expressions 11 to 14. Moreover, since the white XYZ value is converted into the $L^*u^*v^*$ value of Expressions 15 to 17 as a reference white in the target color space, the gray value $L_{tg}^*u_{tg}^*v_{tg}^*$ of the target color space is obtained.

$$(I_{tg}, S_{tg}, H_{tg}) = (I_t, 0, 0) \tag{24}$$

$$m_1 = \begin{cases} I - IS & (I \leq 0.5) \\ I - S + IS & (I > 0.5) \end{cases} \tag{25}$$

$$m_2 = \begin{cases} I + IS & (I \leq 0.5) \\ I + S - IS & (I > 0.5) \end{cases}$$

$$r = \begin{cases} m_2 & (-1 < H \leq 1) \\ m_1 & (H \leq -2, 2 < H) \\ m_1 + (m_2 - m_1)(-H + 2) & (1 < H \leq 2) \\ m_1 + (m_2 - m_1)(H + 2) & (-2 < H \leq -1) \\ I & (H = 値なし) \end{cases} \tag{26}$$

$$g = \begin{cases} m_2 & (1 < H) \\ m_1 & (-2 \leq H < 0) \\ m_1 + (m_2 - m_1)(-H + 2) & (0 < H \leq 1) \\ m_1 + (m_2 - m_1)(H + 2) & (-3 < H \leq -2) \\ I & (H = 値なし) \end{cases}$$

$$b = \begin{cases} m_2 & (H \leq -1) \\ m_1 & (0 < H \leq 2) \\ m_1 + (m_2 - m_1)(-H + 2) & (2 < H \leq 3) \\ m_1 + (m_2 - m_1)(H + 2) & (-1 < H \leq 0) \\ I & (H = 値なし) \end{cases}$$

$$\begin{aligned} R &= 255 r^{1/\gamma} \\ G &= 255 g^{1/\gamma} \\ B &= 255 b^{1/\gamma} \end{aligned} \tag{27}$$

Next, in step S410, a gray value $I_{dg}S_{dg}H_{dg}$ of the projector having the same brightness as the input value $I_tS_tH_t$ is converted into the $L^*u^*v^*$ value, thereby calculating a gray value $L_{dg}^*u_{dg}^*v_{dg}^*$. Therefore, after calculating the gray value $I_{dg}S_{dg}H_{dg}$ by the following Expression 28, it is converted into $R_{dg}G_{dg}B_{dg}$ by the calculation of Expressions 25 to 27.

$$(I_{dg}, S_{dg}, H_{dg}) = (I_t, 0, 0) \tag{28}$$

Moreover, when the $R_{dg}G_{dg}B_{dg}$ is converted into the XYZ value, the $R_{dg}G_{dg}B_{dg}$ is stored in the color output data storing unit 24 in step S120 to be converted into $X_{dg}Y_{dg}Z_{dg}$ by the following Expression 29 using a color output characteristic data $X_RY_RZ_R$, $X_GY_GZ_G$, $X_BY_BZ_B$ at the non-correction.

$$\begin{pmatrix} X \\ Y \\ Z \end{pmatrix} = \begin{pmatrix} X_R(R) + X_G(G) + X_B(B) \\ Y_R(R) + Y_G(G) + Y_B(B) \\ Z_R(R) + Z_G(G) + Z_B(B) \end{pmatrix} \tag{29}$$

Furthermore, when the XYZ value of the white point is converted as a reference white by Expressions 15 to 17 in the target color space, it may obtain the gray value $L_{dg}^*u_{dg}^*v_{dg}^*$ of the projector.

Next, in step S420, the difference value $\Delta L_g^*\Delta u_g^*\Delta v_g^*$ between the gray value $L_{tg}^*u_{tg}^*v_{tg}^*$ of the target color space having the same brightness as the input value $I_tS_tH_t$ and the gray value $L_{dg}^*u_{dg}^*v_{dg}^*$ of the projector is calculated as a reference correction amount. That is, the basic correction amount $\Delta L_g^*\Delta u_g^*\Delta v_g^*$ of the gray axis correction may be obtained by the following Expression 30.

$$(\Delta L_g^*\Delta u_g^*\Delta v_g^*) = (L_{dg1}^* - L_{tg}^*, u_{dg1}^* - u_{tg}^*, v_{dg1}^* - v_{tg}^*) \tag{30}$$

Next, the weighting factor is determined in step S430. The weighting factor $W_g$ is determined in accordance with the following Expression 31 by using the input value $I_tS_tH_t$.

$$W_g = \begin{cases} 1 - S_t & (0.0 \leq I_t \leq 0.5) \\ 1 - 2(1 - I_t)S_t & (0.5 < I_t \leq 1.0) \end{cases} \tag{31}$$

Figure 7:
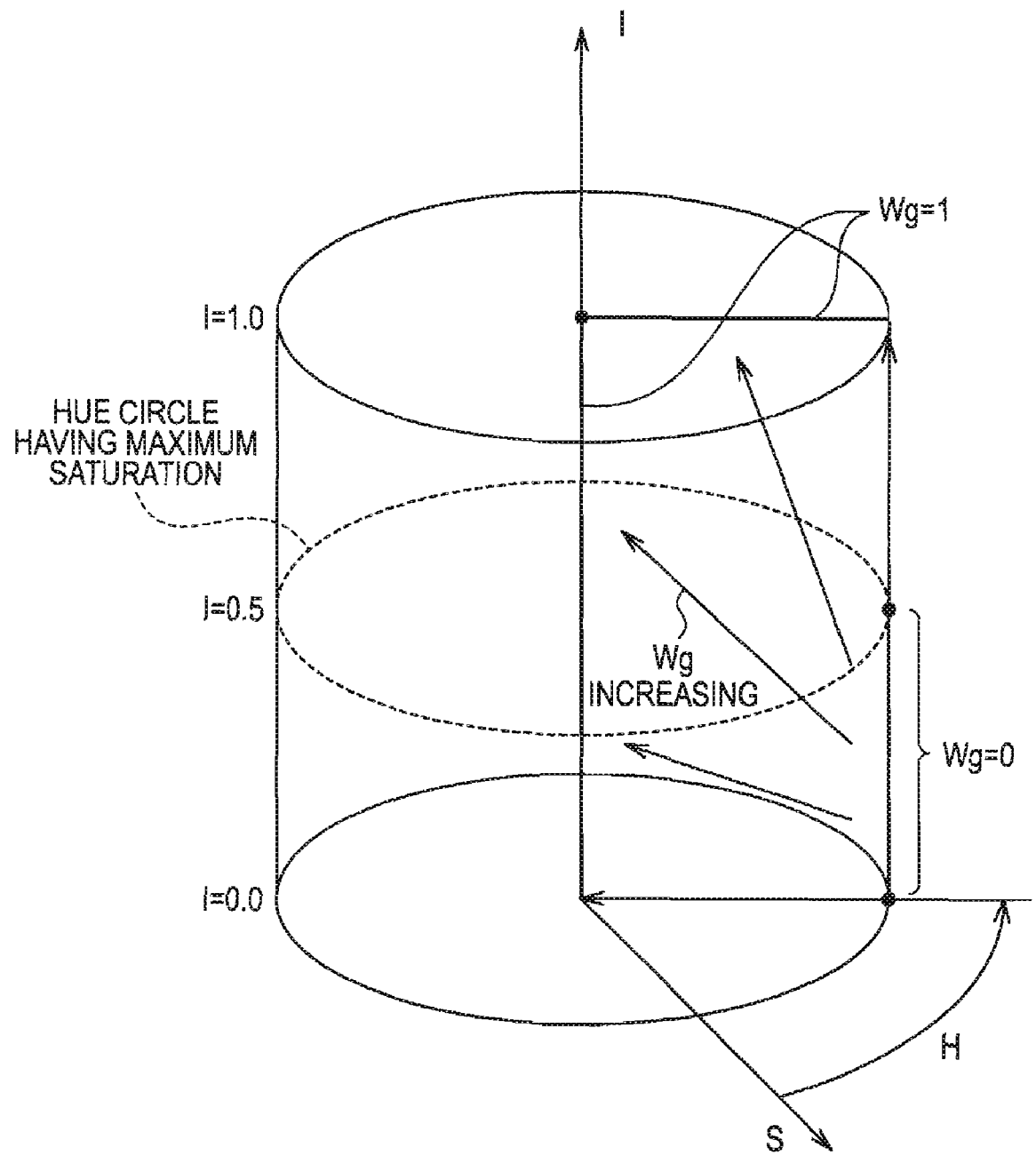
FIG. 7 is a view showing the value of weighting factor $W_g$ in a double hexcone HSI color model.

FIG. 7 is a view showing the value of weighting factor $W_g$ on some color in the color model that normalizes a double hexcone HSI color model in the saturation direction. As shown in FIG. 7, the weighting factor $W_g$ is "0", when the saturation is the maximum ($S_t=1$), and the weighting factor $W_g$ is "1", when the saturation is the minimum ($S_t=0$) and the brightness is the maximum ($I_t=1$). Therefore, in the range of from "0" to "1", the weighting factor $W_g$ becomes the value that changes continuously and monotonously. That is, if the weighting factor $W_g$ is represented by Expression 31, the weighting factor $W_g$ is "1" in the gray axis ($S_t=0$), and the weighting factor $W_g$ is "0" in the range from the black ($I_t=0$, $S_t=1$) in each color to the highest saturation ($I_t=0.5$, $S_t=1$).

Next, in step S440, the gray axis correction is performed according to the basic Expression 18 of the gray axis correction with respect to the input value $L_t^*u_t^*v_t^*$, by using the basic correction amount $\Delta L_g^*\Delta u_g^*\Delta v_g^*$ of the gray axis correction and the weighting factor $W_g$. If the input value $L_t^*u_t^*v_t^*$ is converted into $L_{d1}^*u_{d1}^*v_{d1}^*$ after the gray axis correction, the gray axis correction is terminated.

Figure 8:
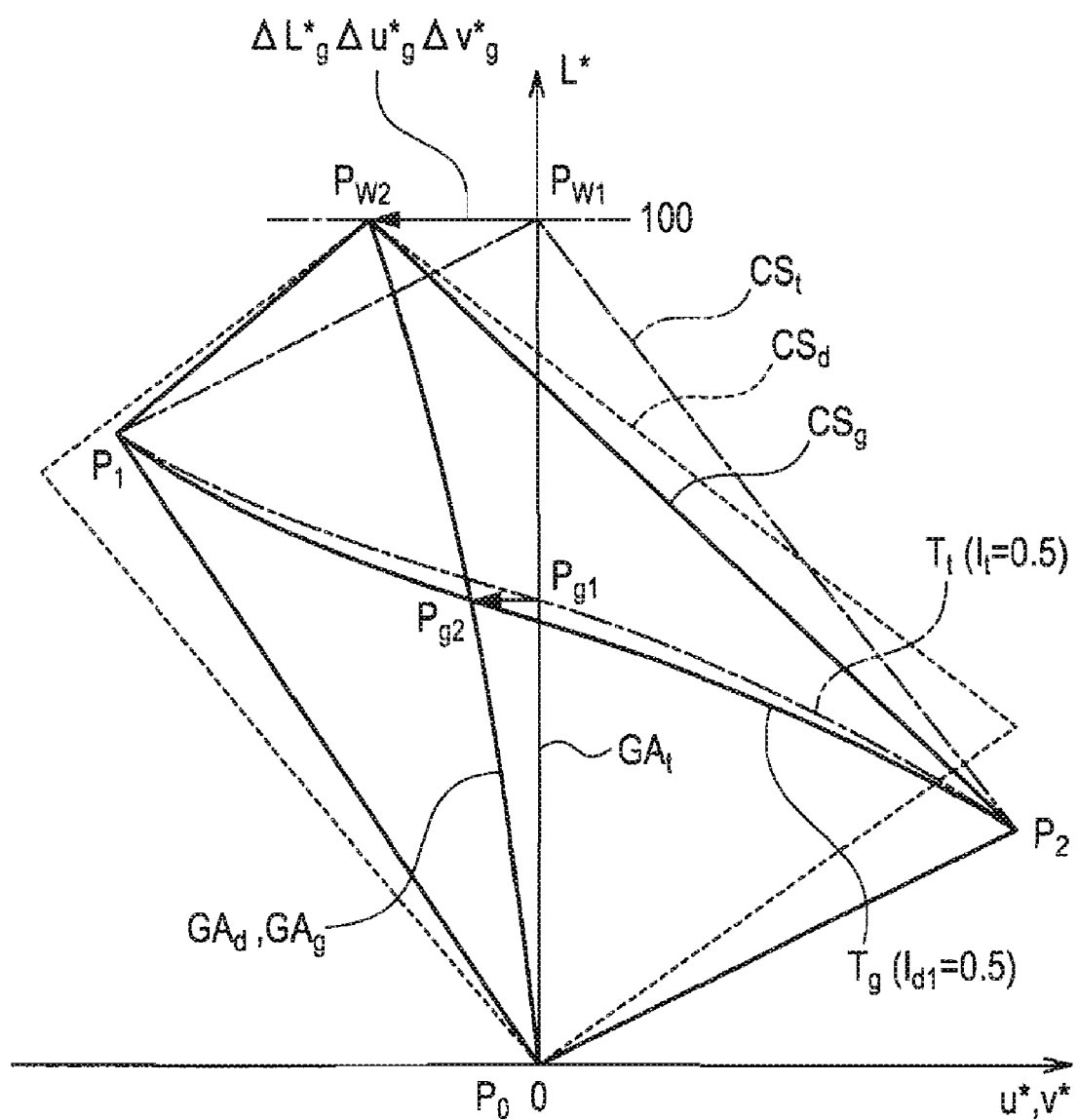
FIG. 8 is an explanatory view explaining a color space between before and after the correction by the gray axis correction.
Figure 9:
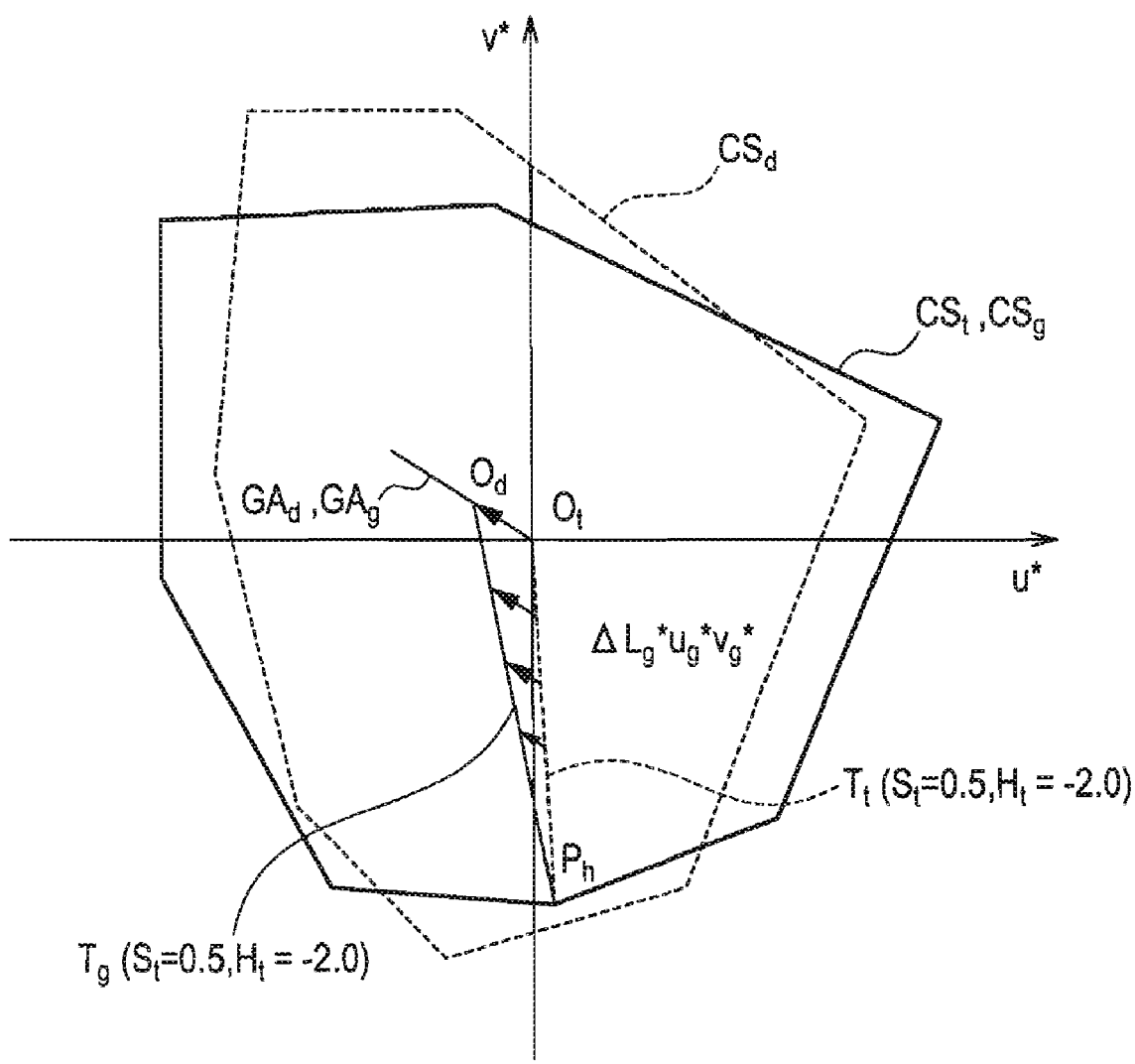
FIG. 9 is an explanatory view explaining a color space between before and after the correction by the gray axis correction.

FIG. 8 is a view showing the color area between before and after the correction by the gray axis correction on $L^*-u^*v^*$ plane of $L^*u^*v^*$ color space, and FIG. 9 is a view showing the color area between before and after the correction by the gray axis correction on $u^*-v^*$ plane of the $L^*u^*v^*$ color space, In FIGS. 8 and 9, a color area $CS_t$ of the target color space before the gray axis correction is indicated by one dotted line, a color reproduction area $CS_d$ at the non-correction is indicated by a dashed line, and a color area $CS_g$ of the target color space after the gray axis correction is indicated by a solid line.

First, as for before the gray axis correction, a gray axis $GA_t$ in the target color space is a straight line on the brightness axis, which links the color point $P_{w1}$ of the white color value and the color point $P_0$ of the black color value to each other (see FIG. 8). Meanwhile, since the color reproduction space has the target gray characteristic (see Expression 2) in consideration of γ value by the color conversion of the second color conversion table, a gray axis $GA_d$ of the color reproduction space at the non-correction is a curved line that links the white point $P_{w2}$ of the color reproduction area and the black color point $P_0$ to each other.

When the gray axis correction is conducted, the weighting factor $W_g$ becomes "1", and only the basic correction amount $\Delta L_g^*\Delta u_g^*\Delta v_g^*$ is corrected while maintaining the same brightness as the color point $P_{w1}$. Therefore, the white point $P_{w1}$ on the color area $CS_t$ of the target color space is converted into the white point $P_{w2}$ of the color reproduction space $CS_d$. Meanwhile, since the basic correction amount $\Delta L_g^*\Delta u_g^*\Delta v_g^*$ of the gray axis correction becomes "0", the black point $P_0$ on the color area $CS_t$ of the target color space is converted into the same color point $P_0$. In addition, since only the difference of the basic correction amount corresponding to the color point is converted, the color point (for example, color point $P_{g1}$) on the gray axis of the target color space is converted into the color point (color point $P_{g2}$) on the gray axis of the color reproduction space, as for the color point of the tone between the white and the black. The color point $P_{g2}$ has the same brightness as the color point $P_{g1}$. However, the gray axis $GA_t$ of the target color space is equal to the gray axis $GA_d$ of the color reproduction space, and is converted into the curved gray axis $GA_g$ that links the white color point $P_{w2}$ and the black color point $P_0$ to each other.

Meanwhile, as for the color area $CS_t$ of the target color space, the weighting factor $W_g$ becomes "0", the color points $P_1$ and $P_2$ having the maximum saturation are converted into the same color points by the gray axis correction However, as for the color area $CS_t$ of the target color space, a trajectory $T_t$ linking the color points $P_1$ and $P_2$ having the maximum saturation is converted into a trajectory $T_g$ that links the color points $P_1$ and $P_2$ having the maximum saturation and goes through the color point $P_{g2}$ after the gray axis correction.

At this time, on the u*–v* plane, the gray axis $GA_g$ after the gray axis correction is equal to the gray axis $GA_d$ of the color reproduction space at the non-correction and becomes the straight line that goes through an achromatic color point $O_t$ (see FIG. 9). At this time, for example, the trajectory $T_t$ having a constant saturation and color ($S_t$=0.5, $H_t$=−2.0) is converted into the straight line that links a color point $P_h$ having the maximum saturation on the trajectory $T_t$ and the color point $O_d$ of the gray.

Then, by the gray axis correction, the target color area $CS_t$ is converted into the color area $CS_g$ of the color space having the gray axis $GA_g$ equal to the gray axis $GA_d$ of the color reproduction space at the non-correction in the Y*u*v* color space.

Figure 5:
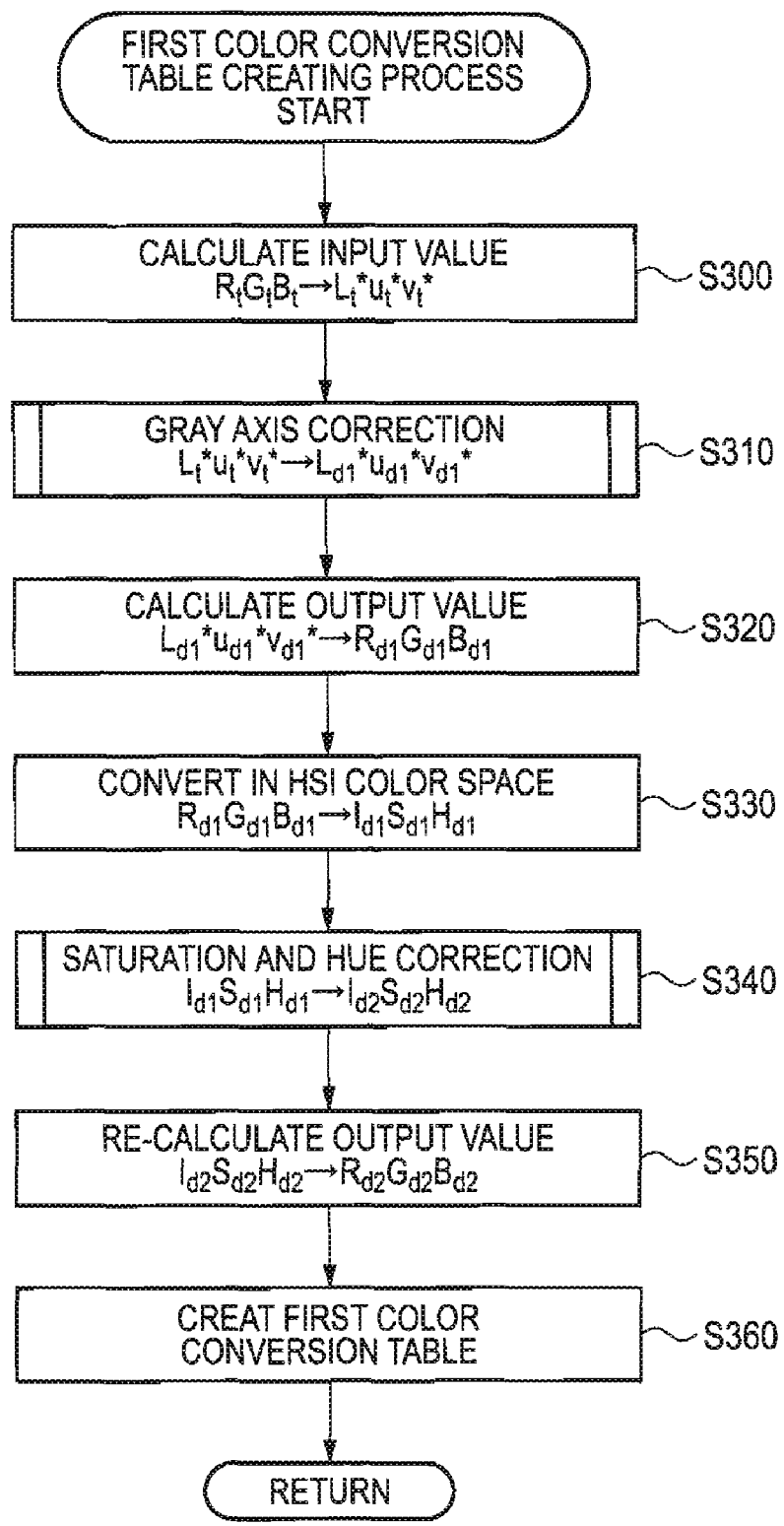
FIG. 5 is a flowchart showing a processing when a first color conversion table is created.

When the gray axis correction is terminated, it returns to the flowchart of FIG. 5. An output value $R_{d1}G_{d1}B_{d1}$ for $L_{d1}*u_{d1}*v_{d1}*$ after the gray axis correction is calculated in step S320. For this reason, first, $X_{d1}Y_{d1}Z_{d1}$ after the gray axis correction is calculated in accordance with the following Expressions 32 and 33.

$$u' = u'_W + u^*/13L^* \atop v' = v'_W + v^*/13L^* \} \quad (32)$$

$$Y = \begin{cases} Y_W(L^*/9033) & (L^* \le 8.0) \\ Y_W((L^*+16)/116)^3 - 16 & (L^* > 8.0) \end{cases} \\ X = Y \times (9u'/4v') \\ Z = Y \times ((36 - 9u' - 4v')/12v') \quad (33)$$

The $X_{d1}Y_{d1}Z_{d1}$ is converted into the RGB value based on the output characteristic of the color output characteristic data by using the color output characteristic data $X_R Y_R Z_R$, $X_G Y_G Z_G$, $X_B Y_B Z_B$ at the non-correction generated by step S120, so as to come close to the output characteristic of the color output characteristic data by the recursive technique. For this reason, during the conversion, it obtains the color output characteristic data $X_R Y_R Z_R$, $X_G Y_G Z_G$, $X_B Y_B Z_B$ at the non-correction generated by step S120 by reading out from the color output characteristic data storing unit 24. Then, $Y_R (R_0) Y_G (G_0) Y_B (B_0)$ is calculated by the conversion matrix $M_0$ corresponding to the white color output characteristic data ($R_{max}$, $G_{max}$, $B_{max}$) by using the following Expressions 34 to 36, as a tentative RGB.

$$M_0 = \begin{pmatrix} X_R(R_{max}) & X_G(G_{max}) & X_B(B_{max}) \\ Y_R(R_{max}) & Y_G(G_{max}) & Y_B(B_{max}) \\ Z_R(R_{max}) & Z_G(G_{max}) & Z_B(B_{max}) \end{pmatrix} \quad (34)$$

-continued $$\begin{pmatrix} Y_R(R_0) \\ Y_G(G_0) \\ Y_B(B_0) \end{pmatrix} = M_0^{-1} \begin{pmatrix} X \\ Y \\ Z \end{pmatrix} \quad (35)$$

$$(R_0, G_0, B_0) = (Y_R(R_0), Y_G(G_0), Y_B(B_0)) \quad (36)$$

Next, each color luminance $Y'_R (R_1) Y'_G (G_1) Y'_B (B_1)$ of RGBs is calculated in accordance with Expressions 37 to 39 by using the conversion matrix $M_1$ corresponding to the color output characteristic data of the tentative RGB value $R_0 G_0 B_0$. Then each color luminance $Y_R (R_1) Y_G (G_1) Y_B (B_1)$ of RGBs is assumed to be the tentative RGB value $R_1 G_1 B_1$ (see Expression 40). In the same way, each color luminance $Y_R (R_2) Y_G (G_2) Y_B (B_2)$ of RGBs is calculated again by the recursively second-calculating the tentative RGB value $R_1 G_1 B_1$ in accordance with Expressions 41 to 43, thereby assuming to be the RGB value $R_{d1} G_{d1} B_{d1}$ after the correction (see Expression 44).

$$\begin{pmatrix} Y_R(R_1) \\ Y_G(G_1) \\ Y_B(B_1) \end{pmatrix} = M_1^{-1} \begin{pmatrix} X \\ Y \\ Z \end{pmatrix} \quad (37)$$

$$M_1 = \begin{pmatrix} X'_R(R_0) & X'_G(G_0) & X'_B(B_0) \\ Y'_R(R_0) & Y'_G(G_0) & Y'_B(B_0) \\ Z'_R(R_0) & Z'_G(G_0) & Z'_B(B_0) \end{pmatrix} \quad (38)$$

$$\begin{pmatrix} X'_R(R_0) \\ Y'_R(R_0) \\ Z'_R(R_0) \end{pmatrix} = \frac{Y_R(R_{max})}{Y_R(R_0)} \begin{pmatrix} X_R(R_0) \\ Y_R(R_0) \\ Z_R(R_0) \end{pmatrix} \quad (39)$$

$$(R_1, G_1, B_1) = (Y_R(R_1), Y_G(G_1), Y_B(B_1)) \quad (40)$$

$$\begin{pmatrix} Y_R(R_2) \\ Y_G(G_2) \\ Y_B(B_2) \end{pmatrix} = M_2^{-1} \begin{pmatrix} X \\ Y \\ Z \end{pmatrix} \quad (41)$$

$$M_2 = \begin{pmatrix} X'_R(R_1) & X'_G(G_1) & X'_B(B_1) \\ Y'_R(R_1) & Y'_G(G_1) & Y'_B(B_1) \\ Z'_R(R_1) & Z'_G(G_1) & Z'_B(B_1) \end{pmatrix} \quad (42)$$

$$\begin{pmatrix} X'_R(R_1) \\ Y'_R(R_1) \\ Z'_R(R_1) \end{pmatrix} = \frac{Y_R(R_{max})}{Y_R(R_1)} \begin{pmatrix} X_R(R_1) \\ Y_R(R_1) \\ Z_R(R_1) \end{pmatrix} \quad (43)$$

$$(R_{d1}, G_{d1}, B_{d1}) = (Y_R(R_2), Y_G(G_2), Y_B(B_2)) \quad (44)$$

That is, it is possible to come gradually close to the tone characteristic of the color output characteristic data $X_R Y_R Z_R$, $X_G Y_G Z_G$, $X_B Y_B Z_B$ at the non-correction by the recursive technique and to obtain the RGB value in which the color conversion is reflected by the second color conversion table while corresponding to the $X_{d1} Y_{d1} Z_{d1}$.

Next, in step S330, since the saturation and hue correction is performed at the HSI color space, the first color conversion table creating unit 25 converts the $R_{d1} G_{d1} B_{d1}$ after the gray axis correction to convert into the $I_{d1} S_{d1} H_{d1}$ on the HSI color space.

Saturation and Hue Correction

Next, in step S340, the first color conversion table creating unit 25 corrects the saturation and hue. The saturation and hue are corrected in accordance with the following basic Expression 45 of the saturation and hue correction in the HSI color space. Here, $\Delta I_s \Delta S_s \Delta H_s$ is the basic correction amount of the saturation and hue correction, and $W_s$ is the weighting factor related to the basic correction amount of the saturation and hue correction. $H_{max}$ is a parameter for adjusting the rotational amount of the hue in the saturation and hue correction, and the value of $H_{max}$ is set beforehand within the range of "0"~"1". The saturation and hue is converted by the color conversion shown in Expression 45, after obtaining the basic correction amount $\Delta L_s^* \Delta u_s^* \Delta v_s^*$ and the weighting factor $W_s$.

$$\begin{pmatrix} I_{d2} \\ S_{d2} \\ H_{d2} \end{pmatrix} = \begin{pmatrix} I_{d1} \\ S_{d1} \\ H_{d1} \end{pmatrix} + W_s \begin{pmatrix} \Delta I_s \\ \Delta S_s \\ H_{max} \Delta H_s \end{pmatrix} \quad (45)$$

Figure 10:
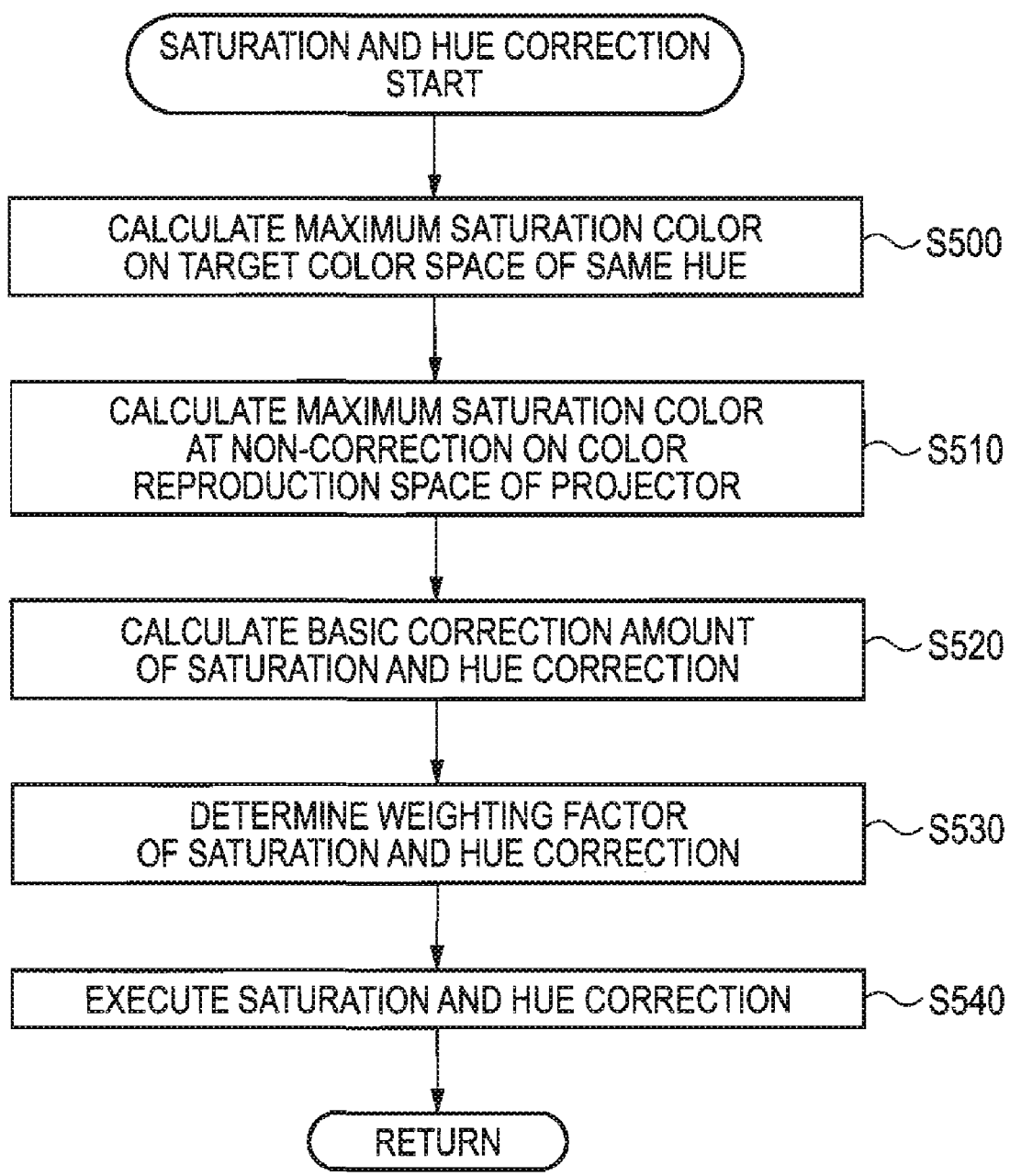
FIG. 10 is a flowchart showing a flow of saturation and hue correction.

Hereinafter, the saturation and hue correction will be described with reference to the flowchart of FIG. 10. When the saturation and hue correction are started, XYZ value of the maximum saturation color in the target color area $CS_t$ having the same hue as the input value $I_t S_t H_t$ is calculated in step S500, first. Here, in the double hexcone HSI color model shown in FIG. 7, since the saturation becomes the maximum on the hue circle having the maximum saturation of "$I_t$=0.5" and "$S_t$=1.0", the maximum saturation color $I_{ts} S_{ts} H_{ts}$ having the same hue as the input value $I_t S_t H_t$ is obtained by the following Expression 46.

$$(I_{ts}, S_{ts}, H_{ts}) = (0.5, 1.0, H_t) \quad (46)$$

After, the maximum saturation color $I_{ts} S_{ts} H_{ts}$ is converted into $R_{ts} G_{ts} B_{ts}$ by the calculation of Expressions 25 to 27, the white XYZ value in the target color area $CS_t$ is converted into the maximum saturation color $X_{ts} Y_{ts} Z_{ts}$ of the target color area as a reference white by the calculation of Expressions 11 to 14.

Furthermore, it obtains the RGB value in step S500 such that the projector outputs the maximum saturation color $X_{ts} Y_{ts} Z_{ts}$. For this reason, the $X_{ts} Y_{ts} Z_{ts}$ is replaced with a maximum saturation color $X_{ds1} Y_{ds1} Z_{ds1}$ by the following Expression 47, and the $X_{ds1} Y_{ds1} Z_{ds1}$ is converted into a maximum saturation color $R_{ds1} G_{ds1} B_{ds1}$ of the projector by recursively calculating, as indicated in Expressions 37 to 44. Then, the $R_{ds1} G_{ds1} B_{ds1}$ is converted into a maximum saturation color $I_{ds1} S_{ds1} H_{ds1}$ of the projector on the HSI color space.

$$(X_{ds1}, Y_{ds1}, Z_{ds1}) = (X_{ts}, Y_{ts}, Z_{ts}) \quad (47)$$

Next, the projector 1 obtains a maximum saturation color $I_{ds2} S_{ds2} H_{ds2}$ at the non-correction when the RGB value is output so as to be similar to the maximum saturation color $R_{ts} G_{ts} B_{ts}$, in step S510. Here, since the RGB value is similar to the $R_{ts} G_{ts} B_{ts}$, the maximum saturation color $I_{ds2} S_{ds2} H_{ds2}$ at the non-correction may be obtained by the following Expression 48.

$$(I_{ds2}, S_{ds2}, H_{ds2}) = (I_{ts}, S_{ts}, H_{ts}) \quad (48)$$

Next, it calculates the difference value $\Delta I_s \Delta S_s \Delta H_s$ between the $I_{ds1} S_{ds1} H_{ds1}$ of the projector having the same color and the maximum saturation color and the $I_{ds2} S_{ds2} H_{ds2}$ at the non-correction as a basic correction amount of the saturation and hue correction in step S520. That is, the basic correction amount $\Delta I_s \Delta S_s \Delta H_s$ of the saturation and hue correction may be obtained by the following Expression 49.

$$(\Delta I_s, \Delta S_s, \Delta H_s) = (I_{ds2} - I_{ds1}, S_{ds2} - S_{ds1}, H_{ds2} - H_{ds1}) \quad (49)$$

Next, the weighting factor $W_s$ of the saturation and hue correction is determined in step S530. For this reason, the change ratio p is calculated in accordance with the following Expressions 50 and 51. Here, "ds" is the magnitude of the basic correction amount $\Delta I_s \Delta S_s \Delta H_s$ of the saturation and hue correction and is the change ratio in the saturation and hue correction, "d" is the value of which the change amount of the HSI color space is converted into the change amount after the saturation and hue correction by the gray axis correction, and the change ratio p shows the ratio into which the color value is changed by the correction in the HSI color space. In addition, "max ( )" is a function that returns the maximum value of the arguments. As indicated in Expression 50, since the value of which "1" is added to the one where the change ratio in the saturation and hue correction or the gray axis correction is larger is assumed to be the change ratio p, as the change ratio p becomes larger, the correction amount of the color value (brightness, saturation, and hue) becomes larger by the gray axis correction or the saturation and hue correction.

$$p = 1 + \max(d_s, d) \quad (50)$$

$$\left. \begin{aligned} d_s &= \sqrt{(\Delta I_s)^2 + (\Delta S_s)^2 + (\Delta H_s)^2} \\ &= \sqrt{(I_{ds2} - I_{ds1})^2 + (S_{ds2} - S_{ds1})^2 + (H_{ds2} - H_{ds1})^2} \\ d &= \sqrt{(I_{ds1} - I_t)^2/S_t^2 + (S_{d1} - S_t)^2/S_t^2 + (H_{d1} - H_t)^2} \end{aligned} \right\} \quad (51)$$

Moreover, it obtains a maximum saturation $S'_{max}$ of a low saturation area that is matched so as to come close to the target color area $CS_g$ after the gray axis correction, by the following Expression 52. Here, "$S_{max}$" is a parameter for adjusting the range that recreates the color of the target color area in the saturation and hue correction, within the range of "−1"~"1", and "D" is a parameter for limiting the change ratio of the saturation and hue. The value of "$S_{max}$" and "D" is necessary to set in advance. "med ( )" is a function that returns the medium value of the plural arguments.

$$S'_{max} = \begin{cases} med\left(0, S_{max}, \dfrac{1}{p} - D\right) & (0 \le S_{max} \le 1) \\ S_{max} & (-1 \le S_{max} < 0) \end{cases} \quad (52)$$

Furthermore, the factors $\alpha$ and A of the weighting factor $W_s$ are calculated by the following Expressions 53 and 54, by using the $S'_{max}$. Moreover, the weighting factor $W_s$ is determined by Expression 55, by using the $S'_{max}$ and the factors $\alpha$ and A. In addition, Expressions 53 to 55 have been decided to give a prescribed characteristic of the curved shape to the basic Expression 45 of the saturation and hue correction.

$$\alpha = \begin{cases} \dfrac{p(1 - S'_{max})}{1 - pS'_{max}} & (0 \le S_{max} \le 1) \\ p + (p - 1)S'_{max} & (-1 \le S_{max} < 0) \end{cases} \quad (53)$$

$$A = \begin{cases} \dfrac{1 - pS'_{max}}{(1 - S'_{max})^\alpha} & (0 \le S_{max} \le 1) \\ 1 & (-1 \le S_{max} < 0) \end{cases} \quad (54)$$

$$W_s = \begin{cases} 0 & (0 \le S_i \le S'_{max}) \\ \dfrac{1 - pS_t - A(1 - S_t)^\alpha}{(1 - p)S_t} & (S'_{max} < S_i \le 1) \end{cases} \quad (55)$$

Next, by using the basic correction amount $\Delta I_s \Delta S_s \Delta H_s$ of the saturation and hue correction obtained by step S520 and the weighting factor $W_s$ of the saturation and hue correction, the color value $I_{d1}S_{d1}H_{d1}$ after the gray axis correction is converted into the color value $I_{d2}S_{d2}H_{d2}$ after the saturation and hue correction by conducting the saturation and hue correction by the basic Expression 45 of the saturation and hue correction, in step S540.

For this reason, as the color point goes away from the gray axis after the gray axis correction, the weighting factor $W_s$ becomes larger Therefore, the saturation and hue are corrected so as to come close to the color reproduction area $CS_d$ at the non-correction, from the target color area $CS_g$.

Figure 11A:
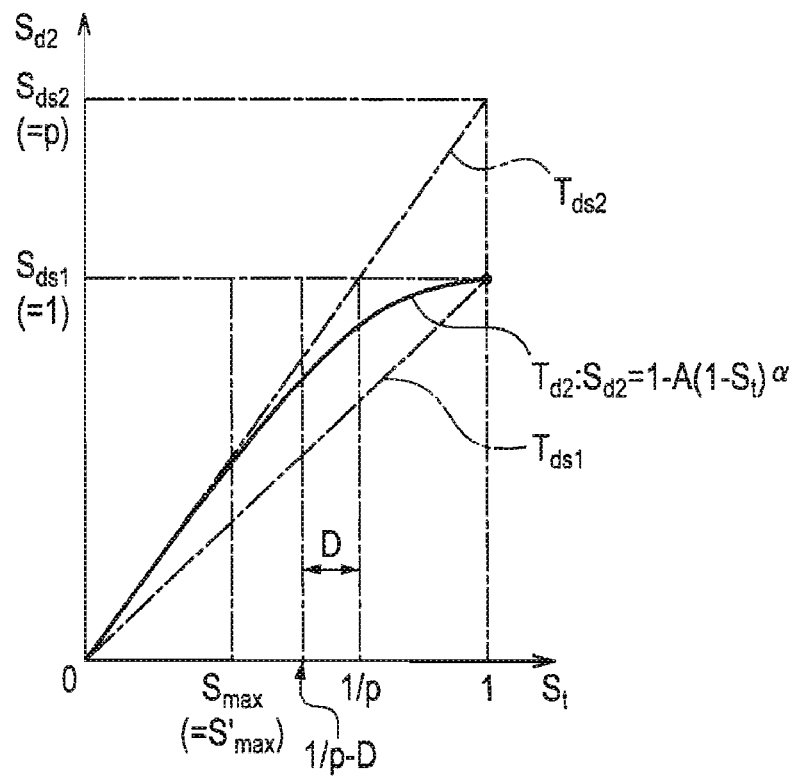
FIG. 11A is an explanatory view for explaining saturation change in the saturation and hue correction, when $S_{max}$ is positive.
Figure 11B:
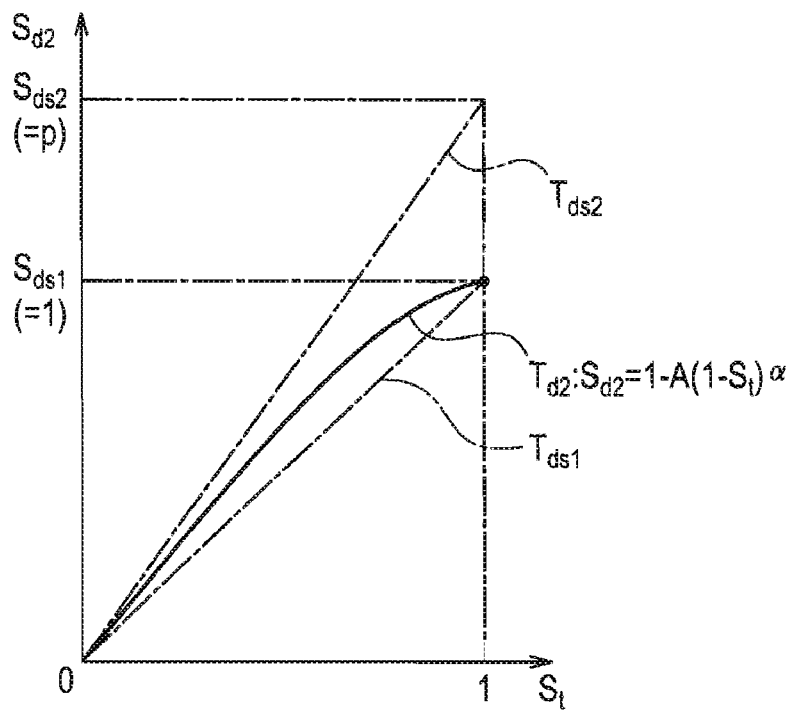
FIG. 11B is an explanatory view for explaining saturation change in the saturation and hue correction, when $S_{max}$ is negative.

Here, the parameter $S_{max}$ is will be described with reference to FIGS. 11A and 11B. FIGS. 11A and 11B shows the saturation $S_t$ of the input value in a horizontal axis and the saturation $S_{d2}$ after the saturation and hue correction in a vertical axis. In addition, for better comprehension and ease of description, FIGS. 11A and 11B show the example where the basic correction amount $\Delta I_S$ and $\Delta H_s$ becomes "0", and the target color area $CS_t$ is wider than the color reproduction area $CS_d$ in the saturation direction. At this time, the in case where the saturation and hue are corrected so as to adapt to the saturation of the color reproduction area $CS_d$, since the target color area $CS_t$ is wider than the color reproduction area $CS_d$ in the saturation direction, "$S_t=1$" is converted into "$S_{ds1}$". Therefore, the saturation $S_{ds2}$ after the saturation and hue correction is represented by a trajectory $T_{ds1}$ ($S_{d2}=S_t$) of gradient "1" for the saturation $S_t$. On the other hand, in the case where the saturation and hue are corrected so as to adapt to the saturation of the target color area $CS_t$, since the change ratio p is the change ratio of the saturation, "$S_t=1$" is converted into "$S_{ds1}=p$ ($>1$)". Therefore, the saturation $S_{ds2}$ is represented by a trajectory $T_{ds2}$ ($S_{d2}p\times S_t$) of gradient "p".

However, since the color reproduction is not conducted beyond the maximum saturation of the color reproduction area $CS_d$ capable of reproducing the color, it is necessary to actually limit the saturation $S_{d2}$ within "1". The weighting factor $W_s$ is set by Expressions 53 and 55. Thus, the saturation $S_{d2}$ after the saturation and hue correction has the following characteristics. That is, the saturation $S_{d2}$ moves on with the trajectory $T_{ds1}$ in the range where the saturation $S_t$ is smaller than the maximum saturation $S'_{max}$ and is represented by the trajectory $T_{dS2}$ ($S_{d2}=1-a(1-S_t)^\alpha$) that comes gradually close to the trajectory $T_{ds1}$ in the range where the saturation $S_t$ is larger than the maximum saturation $S'_{max}$. For this reason, in the saturation and hue correction, the color value of low saturation area comes close to that of the target color area, and the color value of high saturation area comes close to that of the color reproduction area.

In addition, in the case of FIG. 11A showing the example when $S_{max}$ is more than zero, since the saturation $S_t$ becomes larger in the order of "0", "$S_{max}$", "1/p−D", the parameter $S_{max}$ becomes the maximum saturation $S'_{max}$, as indicated in Expression 52. At this time, the trajectory $T_{d2}$ is equal to the trajectory $T_{ds1}$ in the range where the saturation $S_t$ of the input value is "0~$S_{max}$ (=$S'_{max}$). Moreover, the trajectory $T_{d2}$ continues to the trajectory $T_{ds1}$ for $S_{max}$ in the range "$S'_{max}$~1". Furthermore, as the saturation $S_t$ increases, the curved trajectory $T_{d2}$ becomes close to the trajectory $T_{ds1}$ and coincides with the trajectory $T_{ds2}$ at "$S_t=1$".

Furthermore, in the case where "$S_{max}$" is larger than "0" and "1/p−D", the "$S'_{max}$ becomes the "1/p−D", as indicated in Expression 52, the upper limit of the range moved on with the trajectory $T_{ds1}$ is limited by the value of the parameter D. Accordingly, it is possible to control the dramatic change of the trajectory $T_{d2}$ that moves from the trajectory $T_{ds1}$ to the trajectory $T_{ds2}$ due to the narrow range of $S_t$ approximating the trajectory $T_{d2}$. That is, by properly setting the parameter D to the range where "1/p−D" becomes positive, the saturation may be adjusted so as to change smoothly for the change the input value $S_t$.

In case of FIG. 11B showing the example when $S_{max}$ is less than zero, since the $S'_{max}$ becomes not more than "0" by Expression 52, the saturation $S_{d2}$ after the saturation and hue correction is represented by the trajectory $T_{d2}$(=1−A$(1-S_t)^\alpha$) that comes gradually close to the trajectory $T_{ds1}$ from the trajectory $T_{ds2}$ in the range where the saturation $S_t$ is "0~1". That is, as the saturation $S_t$ increases from "$S_{d2}=0$" on the trajectory $T_{ds1}$ at "$S_t=0$" of the input value, the curved trajectory $T_{d2}$ comes gradually close to the trajectory $T_{ds1}$ and coincides with the trajectory $T_{ds2}$. As a result, the saturation and hue are corrected so as to come close to the color reproduction area from the target color area after the gray axis correction, as the saturation becomes higher at the saturation range of $S_t>0$.

Therefore, even though $S_{max}$ is not less than zero or less than zero, as the saturation $S_t$ of the input value becomes high, the saturation is corrected so as to come close to the color reproduction area from the target color area after the gray axis correction, in the saturation and hue correction. Furthermore, since it is "$W_s=0$" at "$S_t=0$", in Expression 55, the color value on the gray axis becomes non-conversion without changing in the saturation and hue correction.

Though the above description is explained about the saturation change, the hue H is also corrected so as to come close to the color reproduction area from the target color area after the gray axis correction, as the saturation $S_t$ of the input value becomes high. In addition, as for the hue, as indicated in Expression 45, since the parameter $H_{max}$ is related to the basic correction amount $\Delta H_s$, the correction amount is changed in accordance with the value of the parameter $H_{max}$. That is, it is possible to adjust the change amount of the hue by setting properly the parameter $H_{max}$.

Figure 12:
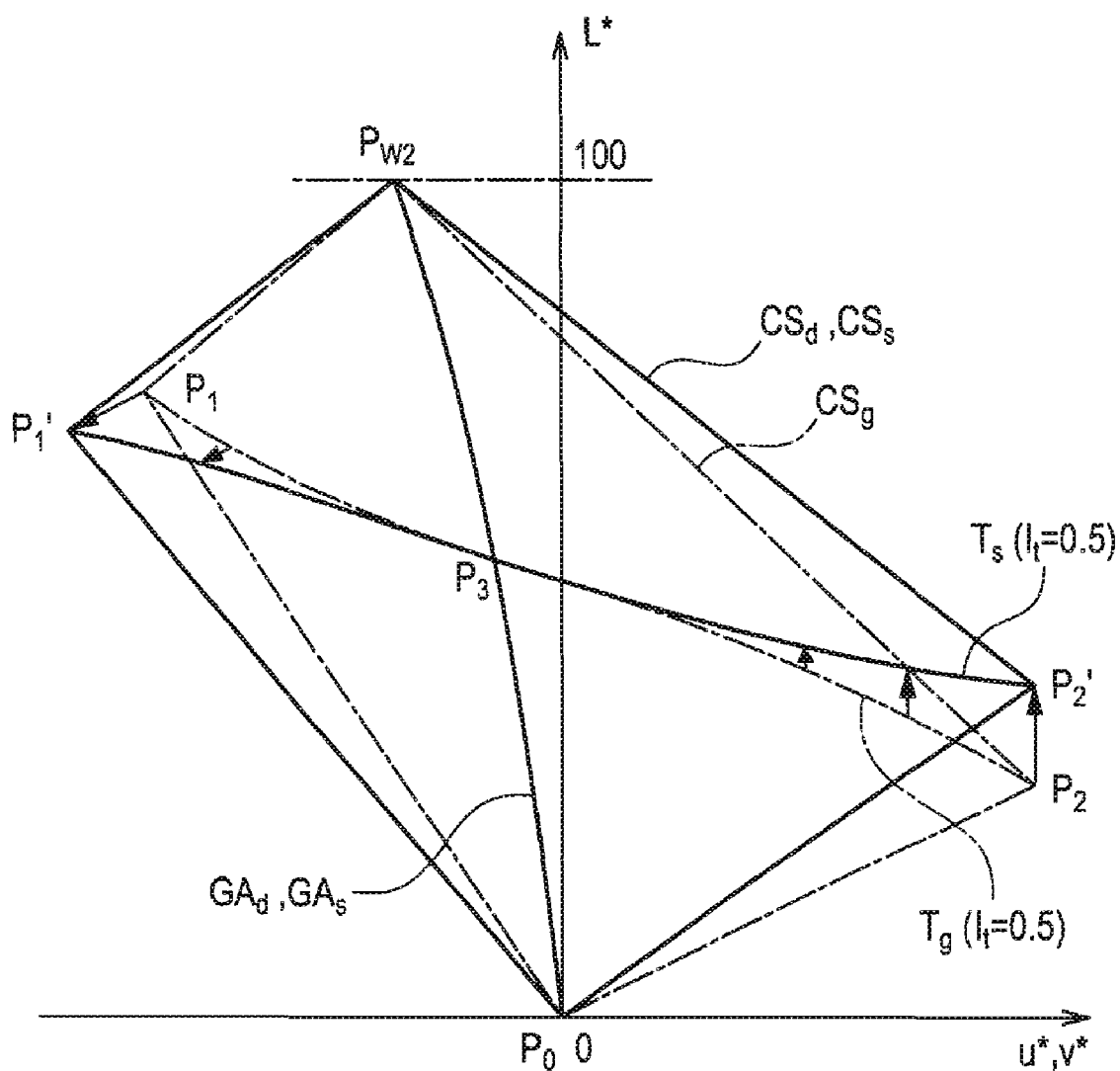
FIG. 12 is an explanatory view for explaining a color space between before and after the correction by the saturation and hue correction.
Figure 13:
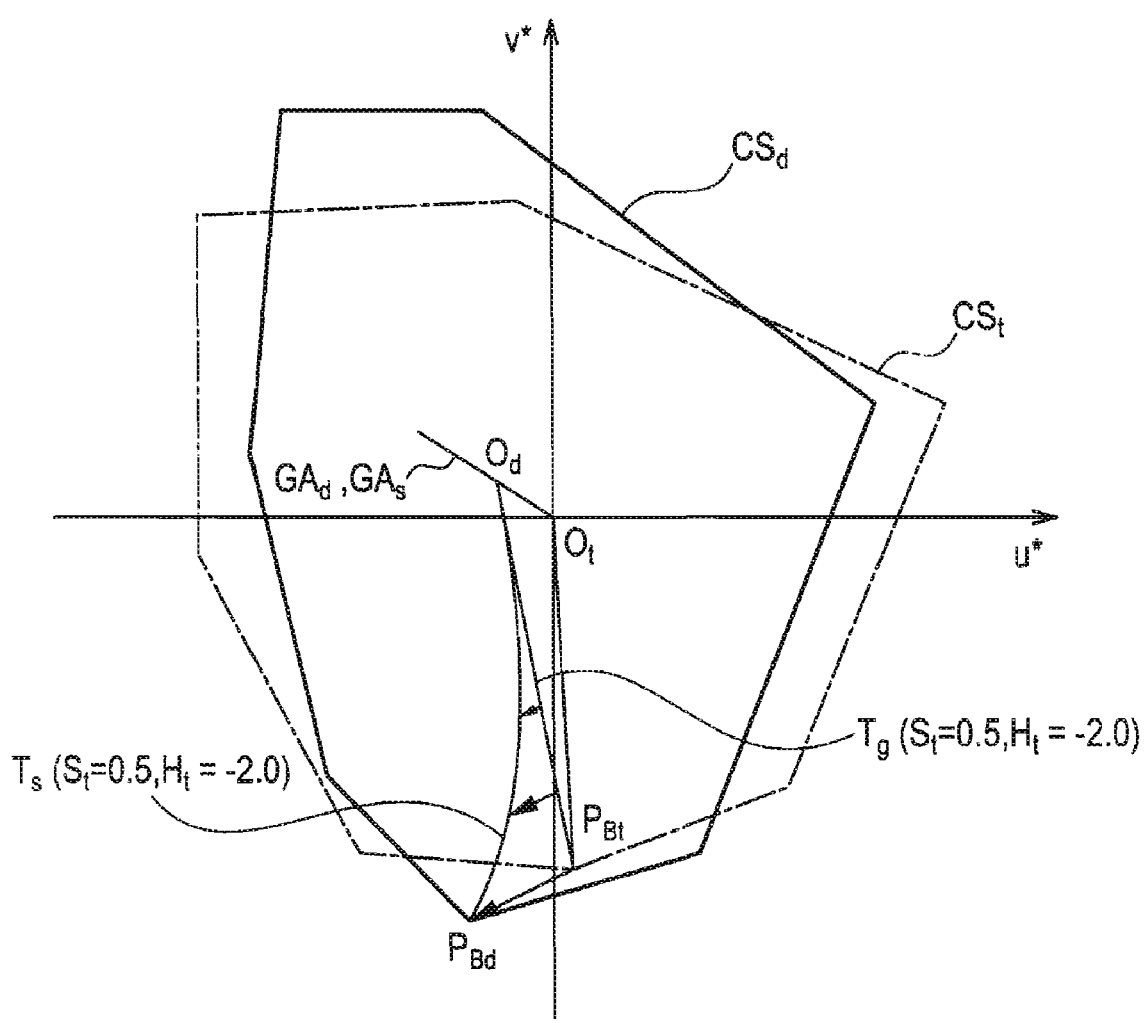
FIG. 13 is an explanatory view for explaining a color space between before and after the correction by the saturation and hue correction.

FIG. 12 is a view showing a color space between before and after the correction by the saturation and hue correction on L*u*v* color space, and FIG. 13 is a view showing the sate on u*v* plane in any L*. In FIGS. 12 and 13, the color area $CS_g$ after the gray axis correction is indicated by one dotted line, and the target color area $CS_s$ after the saturation and hue correction is indicated by a solid line.

As shown in FIG. 12, according to the saturation and hue correction, as for apexes $P_1$ and $P_2$ of the maximum saturation that is the apex in u*v* direction of the target color area $CS_g$ after the gray axis correction, the apex $P_1$ is converted into an apex $P_1'$ of the maximum saturation on the target color area $CS_t$, and the apex $P_2$ is converted into an apex $P_2'$ of the maximum saturation on the target color area $CS_t$. In addition, since it is converted on the device-dependent HSI color space in the saturation and hue correction, a color point $P_3$ that is "$I_t=0.5$" on the gray axis is converted into the same color point. That is, the color value of the gray axis $GA_g$ after the gray axis correction is not converted. In addition, the trajectory $T_g$ of "$I_t=0.5$" after the gray axis correction goes through the apex $P_3$ on the gray axis and is converted into the curved trajectory $T_s$ that has the apex of the maximum saturation of the color reproduction area $CS_d$ as both ends, in u*v* direction. At this time, as shown in FIG. 13, the straight trajectory $T_g$($S_t=0.5$, $H_t=2.0$) after the gray axis correction, which links any color point $O_d$ on the gray axis $GA_d$ and a blue color point $P_{Bt}$ to each other, is converted into a curved trajectory $T_s$ that links the color point $O_d$ and a blue color point $P_{Bd}$ of the color reproduction area $CS_d$, in u*v* direction.

Figure 14:
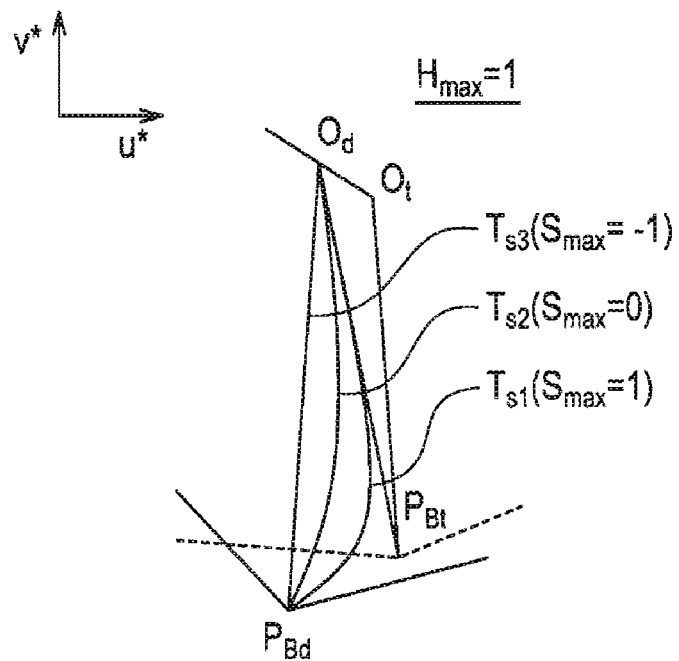
FIG. 14 is a view an explanatory view for explaining $S_{max}$

The influence of the parameter $S_{max}$ on the saturation and hue correction will be described with reference to FIG. 14. FIG. 14 shows a trajectory $T_{s1}$ when $S_{max}$ is "1", a trajectory $T_{s2}$ when $S_{max}$ is "0", and a trajectory $T_{s3}$ when $S_{max}$ is "−1" about the trajectory after the connection of the straight line $O_dP_{Bt}$ on the target color area, on u*-v* plane. Furthermore, for better comprehension and ease of description, $H_{max}$ is assumed to be "1".

As described above, the saturation and hue is corrected in accordance with the target color area $CS_g$ after the gray axis correction at the range where the saturation $S_t$ is not more than $S'_{max}$. Moreover, saturation and hue is corrected so as to come gradually close to the color reproduction area $CS_d$ at the range where the saturation $S_t$ is larger than $S'_{max}$. Here, when $S_{max}$ is "1", $S'_{max}$ becomes "1/p−D" by Expression 52. Accordingly, as shown in FIG. 14, the trajectory $T_{s1}$ traces on the straight line $O_dP_{Bt}$ from the color point $O_d$ to the color point of the color value on the straight line $O_dP_{Bt}$ and becomes a curved line that comes gradually close to the straight line $O_dP_{Bt}$ on the color reproduction area $CS_d$ within the range more than this. In the same way, when $S_{max}$ is "0", $S'_{max}$ becomes "0". Accordingly, the trajectory $T_{s2}$ becomes a cursed line that comes gradually close to the straight line $O_dP_{Bt}$ from the color point $O_d$. When $S_{max}$ is "−1", it becomes "$W_s=1$" by Expressions 52 to 55. Accordingly, it is corrected by just the basic correction amount $\Delta I_s \Delta S_s \Delta H_s$, and the trajectory $T_{s3}$ coincides with the straight line $O_dP_{Bd}$ of the color reproduction area $CS_d$. As a result, it is possible to control the range following the target color area by the parameter $S_{max}$ in the saturation and hue correction.

Figure 15:
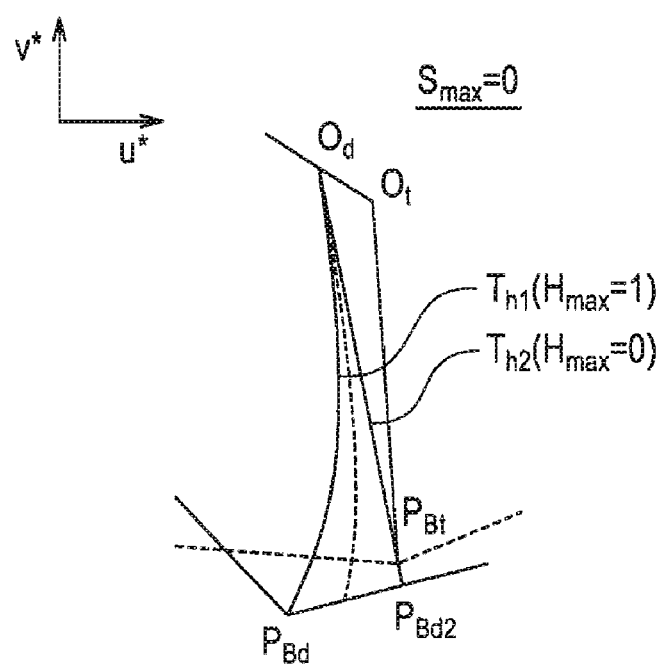
FIG. 15 is a view an explanatory view for explaining, $H_{max}$

The influence of the parameter $H_{max}$ on the saturation and hue correction will be described with reference to FIG. 15. FIG. 15 shows a trajectory $T_{h1}$ when $H_{max}$ is "1" and a trajectory $T_{h2}$ when $H_{max}$ is "0", on u*V* plane. Furthermore, for better comprehension and ease of description, $S_{max}$ is assumed to be "0". Since the trajectory $T_{h1}$ has the same conditions ($H_{max}=1$, $S_{max}=0$) as the trajectory $T_{s2}$ shown in FIG. 14, the trajectory $T_{h1}$ becomes a curved line that comes gradually close to the color reproduction area from the color point $O_d$. As for the trajectory $T_{h2}$, when $H_{max}$ is zero (=0), since the color is not changed by the basic Expression 45 of the correction in the saturation and hue correction. Therefore, the trajectory where the color value on the straight line $O_dP_{Bt}$ is corrected becomes the straight line $O_dP_{Bd2}$ that links the color point $O_d$ and the color point $P_{Bd2}$ having the maximum saturation and hue on an extended line of the straight line $O_dP_{Bt}$ to each other. In addition, when $H_{max}$ takes the value between "0~1", the trajectory becomes a curved line that is located between the trajectory $T_{h1}$ and the trajectory $T_{h2}$, as shown in FIG. 15. Accordingly, it is possible to control the change amount of the hue by the parameter $H_{max}$ in the saturation and hue correction.

It returns to the process of FIG. 5, when the above saturation and hue correction are terminated. In step S350, $I_{d2}S_{d2}H_{d2}$ after the saturation and hue correction is converted into the RGB value in accordance with Expressions 25 to 27, thereby calculating the output value $R_{d2}G_{d2}B_{d2}$.

Next, the first color conversion table that correlates the input value $R_tG_tB_t$ on the target color area with the output value $R_{d2}G_{d2}B_{d2}$ corresponding to the input value is created in step S360. In addition, since the above-described process is conducted about the plural input values $R_tG_tB_t$ that became the prescribed number of tones in each color of RGBs, the first color conversion table indicates the output value $R_{d2}G_{d2}B_{d2}$ to the plural input values $R_tG_tB_t$.

When the first color conversion table is created, the first color conversion table creating process is terminated, and the process returns to FIG. 2. Moreover, the first color conversion table creating unit 25 stores the created first color conversion table 1 the first color conversion table storing unit 31 in step S140.

Next, it is determined whether or not the process of all color modes is terminated in step S150. If the process of all color modes is not terminated (No), it returns to step S100 to select an unprocessed color mode. Then, it performs the process that creates the second color conversion table corresponding to the target color area of the color mode and the first color conversion table. As for all color modes, if the process is terminated (Yes), the process shown in the flowchart of FIG. 2 is terminated.

Furthermore, the process of step S100 corresponds to the first color space setting process of claims, and the process of step S130 corresponds to the first color conversion table creating process of claims.

As described above, the color conversion table creating unit 20 creates the first color conversion, table to which the gray axis correction and the saturation and hue correction are considered, by the first color conversion table creating process. Moreover, the color conversion table creating unit 20 terminates the color conversion table creating process in the state where the first color conversion table is stored in the first color conversion table storing unit 31.

Figure 16:
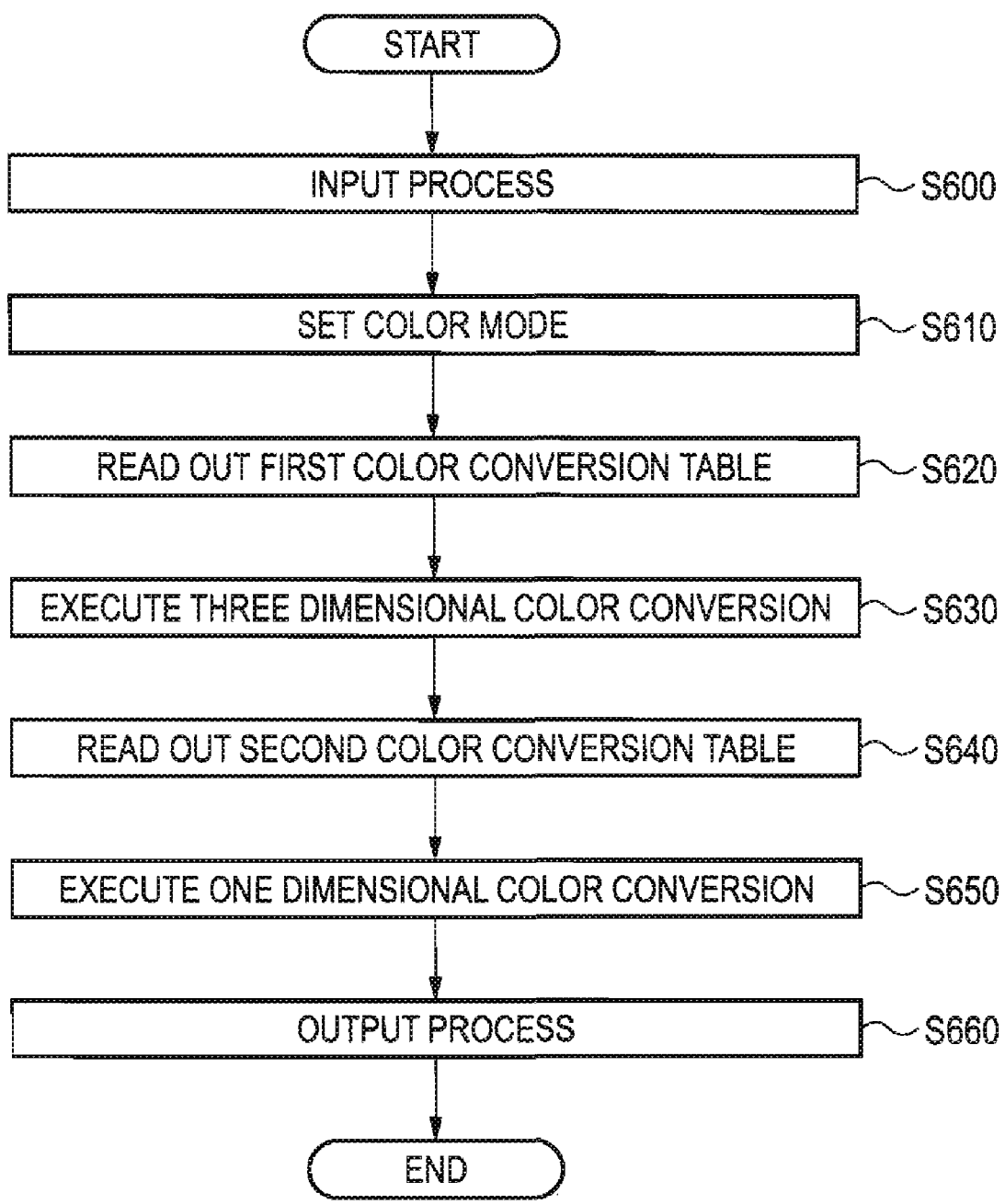
FIG. 16 is a flowchart showing a processing flow during the color correction.

Next, it will be described about the process of the color correction of an image data inputted in the projector 1 by using the first color conversion table that is created by the color conversion table creating process with reference to the flowchart of FIG. 16.

When the color correction is started, the image data inputting unit 10 performs the input process about the image data inputted from an external device or the like in step S600. For example, when the image processing unit 30 processes the data of 10 bits, the image data inputted from the external device is converted into the input value $R_{in}G_{in}B_{in}$ of 10 bits in each color of RGBs by the input process and transfers to the image processing unit 30.

Next, the first color conversion executing unit 32 sets the color mode in step S610. For example, the color mode is set so as to correspond to the selection of user conducted beforehand and a king of the input image data.

Next, the first color conversion executing unit 32 reads out the first color conversion table corresponding to the color mode that is set by the first color conversion table storing unit 31 in step S620.

Next, the first color conversion executing unit 32 executes three-dimensional color conversion to the input value $R_{in}G_{in}B_{in}$ in accordance with the first color conversion table to correct into the RGB value of which the gray axis correction and the saturation and hue correction are conducted, in step S630.

Next, the second color conversion executing unit 34 reads out by the second color conversion table storing unit 33 in step S640.

Next, the second color conversion executing unit 34 executes one-dimensional color conversion to each color of RGBs after the process of step S630 in accordance with the second color conversion table to correct into the RGB value which corresponds to the output characteristic of the projector in step S650.

Next, the second color conversion executing unit 34 performs the output process that outputs the corrected RGB value to the L/V driving unit 40 as an output value $R_{out}G_{out}B_{out}$. Therefore, the image that gives the gray axis correction and the saturation and hue correction is displayed on the light valve of the projector 1 in step S660.

In addition, the process of step S630 corresponds to the first color conversion process of claims, and the process of step S650 corresponds to the second color conversion process of claims.

As described above, according to the projector of the first exemplary embodiment, it is possible to display the image that reflects the image results due to the gray axis correction and the saturation and hue correction.

Figure 17:
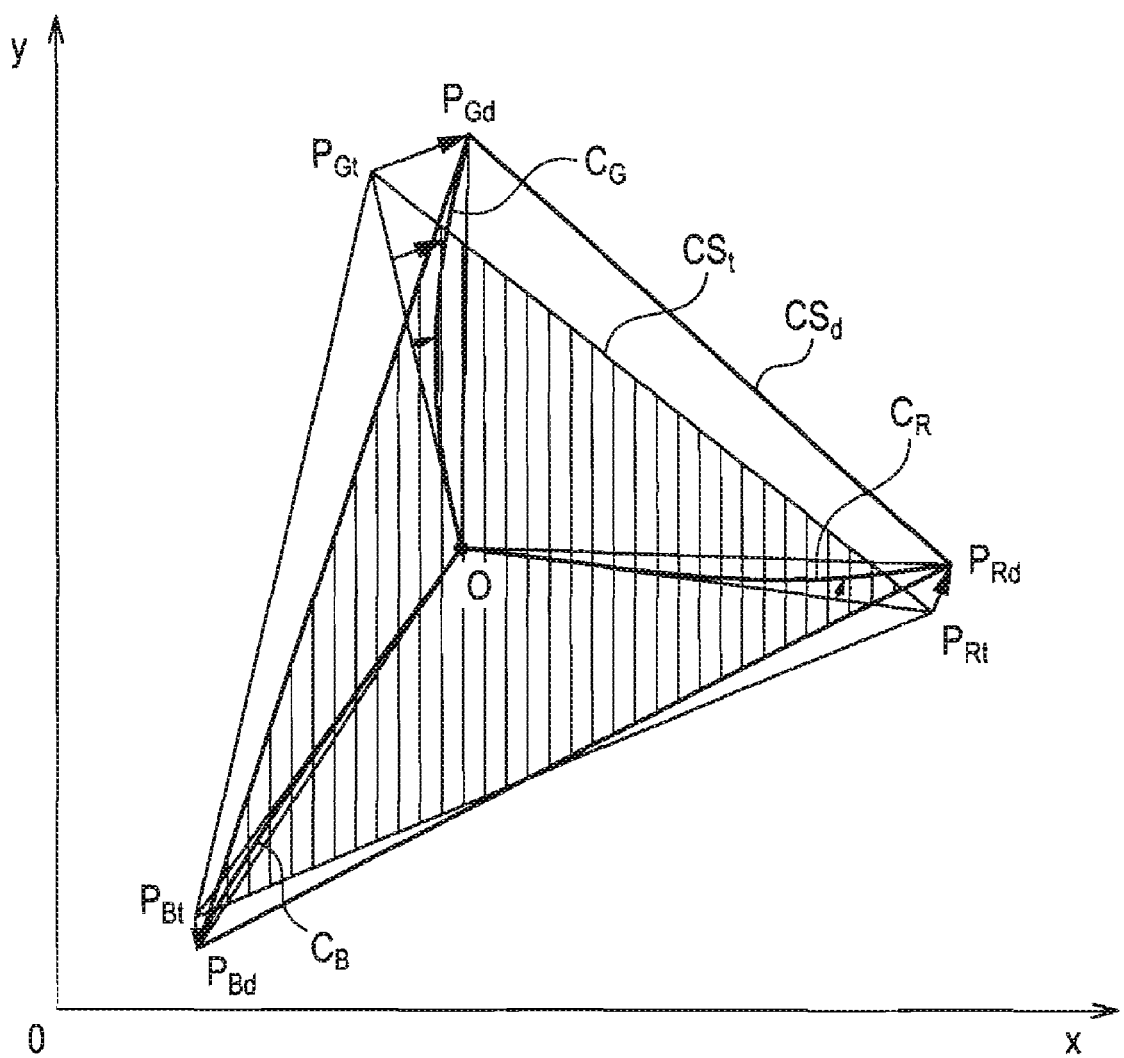
FIG. 17 is an explanatory view for explaining a color space after the correction.

Next, it will be described about the color space that can be reproduced by the projector 1 according to this exemplary embodiment due to the gray axis correction and the saturation and hue correction. As shown in FIG. 17, the target color area $CS_t$ is represented by a color triangle that is surrounded by red color point $P_{Rt}$, green color point $P_{Gt}$, and blue color point $P_{Bt}$ in x-y chromaticity coordinates. In addition, the color reproduction area $CS_d$ that can be reproduced by the projector 1 is represented by a color triangle that is surrounded by red color point $P_{Rd}$, green color point $P_{Gd}$, and blue color point $P_{Bd}$.

Here, in the case where the color reproduction area $CS_d$ and the target color area $CS_t$ have different areas, when it tries to reproduce a color faithful to target color area $CS_t$, only the color space in the overlapped range (hatching area of FIG. 17) of the color reproduction area $CS_d$ and the target color area $CS_t$ is used for the color reproduction, and other color spaces cannot be used. Accordingly, it cannot utilize the entire area of the color reproduction area $CS_d$. The projector 1 adapts the gray axis of the target color space to the gray axis of the color reproduction space at the non-correction by the gray axis correction. Moreover, in the saturation and hue correction, the gray axis is assumed to be non-correction, and the projector 1 adapts the outermost part of the target color area after the gray axis correction to the outermost part of the color reproduction area. For this reason, it is possible to obtain the color space having the same color area as the color reproduction area $CS_d$. In addition, a tone curve $C_R C_G C_B$ for each color of RGBs has a curved tone characteristic that comes close to the color reproduction area $CS_d$ from the target color area, while increasing in the tone by the color conversion of the second color conversion table.

The effects according to this exemplary embodiment will be described hereinafter.

In the gray axis correction, the gray axis on the Y*u*v* color space is corrected into the gray axis of the projector to which the second color conversion table is applied. Moreover, in the saturation and hue correction, the color value in the gray axis is assumed to be non-conversion, and the matching of the color area is performed. For this reason, as for the color conversion by the first color conversion table, the gray axis on the device-dependent RGB color space becomes non-conversion. Since the gray axis of non-correction is adjusted by the second color conversion table, the gray axis can be accurately adjusted according to the target gray characteristic. Accordingly, it is possible to achieve a good color reproduction having the target gray characteristic.

(2) In the color conversion of the first color conversion table, since the target color area is matched to the color reproduction area without converting the gray axis, even when adjusting to any target gray characteristic, the gray axis can be accurately adjusted.

(3) In the gray axis correction, since the color value close to the gray axis of the target color space is corrected into the color value close to the gray axis of the color reproduction space in the device-independent L*u*v* color space, it can achieve the color reproduction that comes continuously close to the gray axis as comes close to the gray axis.

(4) In the saturation and hue correction, among the target color area after the gray axis correction, the low saturation area is corrected so as to come close to the target color area, and the high saturation area is corrected so as to come close to the color reproduction area. Therefore, it can wholly achieve the color reproduction close to the target color area while effectively utilizing the high luminance area of the color reproduction area.

(5) In the saturation and hue correction, since the outermost color value of the target color area is matched with the outermost part of the color reproduction area, it can achieve the color reproduction that takes advantage of the entire area.

(6) Since it can adjust the range of the high saturation area that performs the color reproduction close to the color reproduction area $CS_d$ by properly setting the parameter $S_{max}$ in the saturation and hue correction, the very suitable color reproduction can be achieved according to a taste of user or a kind of image data.

(7) Since it can adjust the change amount of the hue due to the saturation and hue correction by properly setting the parameter $H_{max}$, the suitable color reproduction can be achieved according to a taste of user or a kind of image data.

(8) Since it can control the dramatic change if the tone by properly setting the parameter D in the saturation and hue correction, the suitable color reproduction can be achieved to hold the smooth tone characteristic.

(9) Since the saturation and hue correction are performed on the HSI color space, it can accurately and simply conduct the saturation and hue correction without converting the color value on the gay axis while changing the saturation and hue.

(10) As for the color conversion from $X_{d1}Y_{d1}Z_{d1}$ in step S320 of the conversion course toward HSI color space to $R_{d1}G_{d1}B_{d1}$, since it is recursively calculated by using the color output characteristic data at the non-correction showing the correspondence of the measured RGB value and XYZ value, the output after the adjustment of the gray axis and the adjustment of the tone characteristic of the display device is considered. Therefore, the color conversion can be very accurately performed.

(11) As for the color conversion from $R_{dg}G_{dg}B_{dg}$ in step S410 of the conversion course toward L*u*v* color space to $X_{gd}Y_{dg}Z_{dg}$ and the color conversion from $X_{ds1}Y_{ds1}Z_{ds1}$ in step S500 to $R_{ds1}G_{ds1}B_{ds1}$, since it is recursively calculated by using the color output characteristic data at the non-correction showing the correspondence of the measured RGB value and XYZ value, the output after the adjustment of the gray axis and the adjustment of the tone characteristic of the display device is considered. Therefore, the color conversion can be very accurately performed.

Second Exemplary Embodiment

Hereinafter, the second exemplary embodiment will be described.

Figure 18:
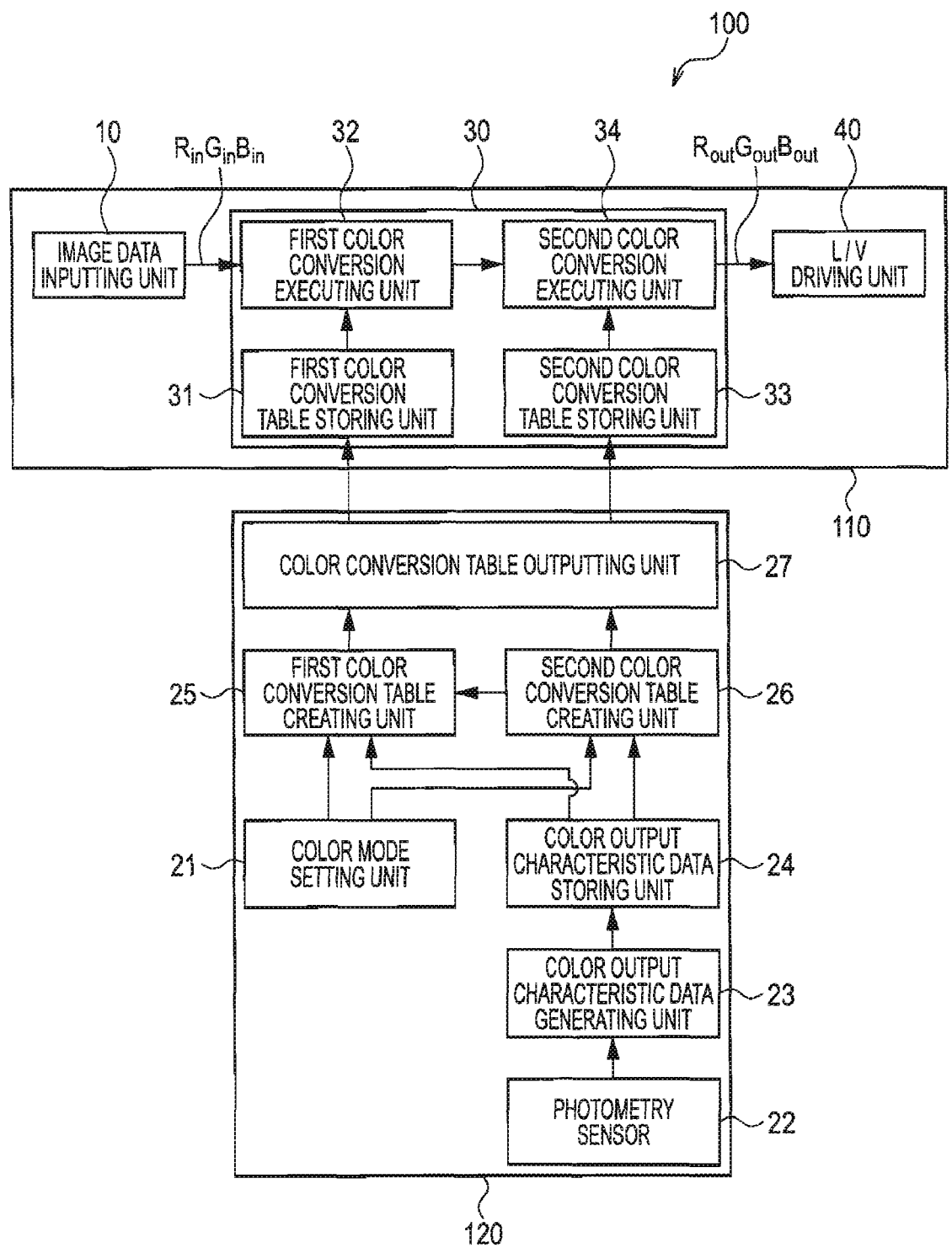
FIG. 18 is a block diagram showing a structure of a color correction system according to a second exemplary embodiment.

The second exemplary embodiment relates to a color correction system for manufacturing the projector in which the color correction is performed. FIG. 18 is a block diagram showing the structure of the color correction system according to the second exemplary embodiment. As shown in FIG. 18, a color correction system 100 includes a projector 110 and a color correction device 120 that corresponds to the projector 110 to perform the color correction. The projector 110 and the color correction device 120 are connected to each other so as to communicate mutually.

The projector 110 includes an image data inputting unit 10, an image processing unit 30, and an L/V driving unit 40. The image processing unit 30 has a first color conversion table storing unit 31, a first color conversion executing unit 32, a second color conversion table storing unit 33, and a second color conversion executing unit 34. That is, the projector 110 is configured such that the color conversion table creating unit 20 is removed from the projector 1 according to the first exemplary embodiment.

The color conversion device 120 includes a color mode setting unit 21, a first color conversion table creating unit 25, a second color conversion table creating unit 26, a photometry sensor 22, a color output characteristic data generating unit 23, and a color conversion table outputting unit 27. That is, the color correction device 120 is configured so as to have the color conversion table outputting unit 27 in addition to the color conversion table creating unit 20 according to the first exemplary embodiment.

The color conversion table outputting unit 27 outputs the created color conversion table to the projector 110 to write to the color conversion table storing unit. More specifically, the color conversion table outputting unit 27 outputs the first color conversion table to the projector 110 to store in the first color conversion table storing unit 31. Moreover, the color conversion table outputting unit 27 outputs the second color conversion table to the projector 110 to store in the second color conversion table storing unit 33.

According to the color correction system 100 having the above-described configuration, when the color correction is executed with respect to the projector 110, the color correction device 120 performs the process of FIG. 2. That is, the second color conversion table is stored in the second color conversion table storing unit 33 in step S120, and the first color conversion table is stored in the first color conversion table storing unit 32 in step S140 (table storing process). In addition, when the projector 110 displays the image, the projector 110 can display the image that is corrected by the process of FIG. 16.

Accordingly, according to the second exemplary embodiment, it can manufacture the projector that can obtain the effects (1) to (11) according to the first exemplary embodiment.

Although the first and second exemplary embodiments were described, the invention may be modified by various examples without being limited thereto. Some modifications of the exemplary embodiments will be described hereinafter.

Modified Example 1

The gray axis correction is performed on the L*u*v* color space, according to the above-described embodiments. However, the gray axis correction may be performed on the device-independent color space, for example, L*a*b* color space or XYZ color space.

Modified Example 2

The gray axis correction and the saturation and hue correction are performed in the first color conversion table creating process, according to the above-described embodiments. However, either of the gray axis correction or the saturation and hue correction may be performed in accordance with the set of the color mode.

Modified Example 3

The adjustment of the gray axis corresponding to the target gray characteristic and the adjustment of the tone characteristic for each color of RGBs corresponding to the output characteristic of the display device are performed by the color conversion based on the second color conversion table, according to the above-described embodiments. However, the adjustment of the gray axis and the tone adjustment for each color of RGBs may be converted by different tables.

Modified Example 4

The projector 1 performs the first color correction and the second color correction, according to the above-described embodiments. However, the image processing device outside the projector carries out the first color correction and the second color correction to output the output value $R_{out} G_{out} B_{out}$ and the projector may carry out the gray correction and the saturation and hue correction by the output value from the image processing device to display.

According to the above-described exemplary embodiments and the medication examples, examples where exemplary embodiments are applied to a front project not having the screen as a display device were described. The invention may be applied to various display devices, for example, a rear projector, a plasma display, a liquid crystal display, or CRT (Cathode Ray Tube) without being limited thereto.

What is claimed is:

1. An image processing device that converts a color value on a first color space into a different color value corresponding to a second color on a second color space, the device comprising:
    a first color conversion unit that converts the color value in the first color space into the different color value without adjusting a gray axis; and
    a second color conversion unit that adjusts the gray axis in the first color space after the color value has been converted into the different color value,
    the first color conversion unit converting the color value in accordance with a first color conversion table that correlates the color value on a part other than the gray axis with a correlating color value and adapts the color value on the part other than the gray axis to the second color of the second color space, and
    the first color conversion unit correlating the color value on the part other than the gray axis so that the color value of low saturation comes close to the color value on the first color space and so that the color value of high saturation comes close to the color value on the second color space.

2. A color conversion table creating device that creates a color conversion table for performing a color conversion of a color value on a first color space into a color value on a second color space, the device comprising:
    a first color space setting unit that sets a color area of the first color space; and
    a first color conversion table creating unit that (1) converts the color value in the set color area of the first color space without converting a gray axis part of the color value and (2) creates a first color conversion table that correlates the color value on a part other than the gray axis part with a correlating color value that adapts the color value on the part other than the gray axis part to the color value on the second color space,
    the first color conversion table creating unit correlating the color value on the part other than the gray axis part on the first color space so that the color value of low saturation comes close to the color value on the first color space and so that the color value of high saturation comes close to the color value on the second color space.

3. The color conversion table creating device according to claim 2, further comprising a second color conversion table acquiring unit that acquires a second color conversion table to adjust a gray axis part of the color value of the second color space with respect to the color value on the first color space.

4. The color conversion table creating device according to claim 3,
the first color conversion table creating unit converting the color value on the first color space into a device-independent color value on a device-independent color space, and in the device-independent color space, corrects the gray axis part of the color value on the first color space to the color value on the gray axis part adjusted by the second color conversion table in the second color space so as to not convert the corrected gray axis part of the color value on the first color space.

5. The color conversion table creating device according to claim 4, the first color conversion table creating unit correlating, for the color value on the part other than the gray axis part in the first color space, a color value closer to the gray axis part of the first color space with a color value closer to the gray axis part in the second color space, in the device-independent color space.

6. The color conversion table creating device according to claim 5, the first color conversion table creating unit carrying out the color conversion to the second color space from the device-independent color space in consideration of the output characteristic of a display device after the application of the second color conversion table.

7. The color conversion table creating device according to claim 2, the first color conversion table creating unit correlating an outermost color value of the color area in the first color space with an outermost color value of the color area in the second color space.

8. The color conversion table creating device according to claim 2, the first color conversion table creating unit converting the color value on the first color space into a color value on an HSI color space to correlate the color value in the HSI color space.

9. The color conversion table creating device according to claim 2, the first color conversion table creating unit carrying out the color conversion to the second color space from the HSI color space in consideration of an output characteristic of the display device after the application of the second color conversion table.

10. The color conversion table creating device according to claim 2, the first color conversion table creating unit adjusting the range of the color value of high saturation.

11. The color conversion table creating device according to claim 2, the first color conversion table creating unit adjusting a change amount of a hue by the color conversion of the first color conversion table.

12. A display device comprising the image processing device of claim 1.

13. An image processing method that converts a color value on a first color space into a different color value corresponding to a second color on a second color space, the method comprising:
a first color conversion process that that converts the color value in the first color space into the different color value without adjusting the gray axis; and
a second color conversion process that adjusts the gray axis in the first color space after the color value has been converted into the different color value,
the first color conversion process converting the color value in accordance with a first color conversion table that correlates the color value on a part other than the gray axis with a correlating color value and adapts the color value on the part other than the gray axis to the second color of the second color space, and
the first color conversion process correlating the color value on the part other than the gray axis so that the color value of low saturation comes close to the color value on the first color space and so that the color value of high saturation comes close to the color value on the second color space.

14. A color conversion table creating method that creates a color conversion table for performing a color conversion of a color value on a first color space into a color value on a second color space, the method comprising:
a first color space setting process that sets a color area of the first color space; and
a first color conversion table creating process that (1) converts the color value in the set color area of the first color space without converting a gray axis part of the color value and (2) creates a first color conversion table that correlates the color value on the part other than the gray axis part with a correlating color value that adapts the color value on the part other than the gray axis part to the color value on the second color space,
the first color conversion table creating process correlating the color value on the part other than the gray axis part on the first color space so that the color value of low saturation comes close to the color value on the first color space and so that the color value of high saturation comes close to the color value on the second color space.

15. A method of manufacturing a display device that carries out color conversion in accordance with a color conversion table, the method comprising:
a first color space setting process that sets a color area of the first color space;
a first color conversion table creating process that (1) converts the color value in the set color area of the first color space without converting a gray axis part of the color value and (2) creates a first color conversion table that correlates the color value on the part other than the gray axis part with a correlating color value that adapts the color value on the part other than the gray axis part to the color value on the second color space; and
a table storing process that stores the created first color conversion table in the display device,
the first color conversion table creating process correlating the color value on the part other than the gray axis part on the first color space so that the color value of low saturation comes close to the color value on the first color space and so that the color value of high saturation comes close to the color value on the second color space.

* * * * *